US009566661B2

(12) United States Patent
Seo et al.

(10) Patent No.: US 9,566,661 B2
(45) Date of Patent: Feb. 14, 2017

(54) FRICTION STIR WELDING METHOD

(71) Applicant: NIPPON LIGHT METAL COMPANY, LTD., Tokyo (JP)

(72) Inventors: Nobushiro Seo, Shizuoka (JP); Hisashi Hori, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/750,163

(22) Filed: Jun. 25, 2015

(65) Prior Publication Data

US 2015/0290739 A1 Oct. 15, 2015

Related U.S. Application Data

(63) Continuation of application No. 14/237,998, filed as application No. PCT/JP2012/068931 on Jul. 26, 2012, now Pat. No. 9,095,927.

(30) Foreign Application Priority Data

Aug. 19, 2011 (JP) .................................. 2011-179586
Aug. 30, 2011 (JP) .................................. 2011-187916

(51) Int. Cl.
*B23K 20/12* (2006.01)

(52) U.S. Cl.
CPC ......... *B23K 20/1245* (2013.01); *B23K 20/122* (2013.01); *B23K 20/128* (2013.01); *B23K 20/1225* (2013.01); *B23K 20/1265* (2013.01)

(58) Field of Classification Search
CPC ....................................... B23K 20/122–20/128

USPC ................................................ 228/112.1, 2.1
See application file for complete search history.

(56) References Cited

U.S. PATENT DOCUMENTS

| 5,971,247 | A | 10/1999 | Gentry |
| 5,971,252 | A | 10/1999 | Rosen et al. |
| 6,029,879 | A | 2/2000 | Cocks |
| 6,053,391 | A | 4/2000 | Heideman et al. |
| 6,352,193 | B1 | 3/2002 | Bellino et al. |

(Continued)

FOREIGN PATENT DOCUMENTS

| CN | 102470480 A | 5/2012 | |
| EP | 1314508 A2 * | 5/2003 | ........... B23K 20/124 |

(Continued)

OTHER PUBLICATIONS

Machine translation of JP 2010-194545A (no date available).*

(Continued)

*Primary Examiner* — Kiley Stoner
(74) *Attorney, Agent, or Firm* — Squire Patton Boggs (US) LLP

(57) ABSTRACT

The invention aims at providing a friction stir welding method which can achieve joining a butting portion to a deep location therein by reducing the load on the friction stirring device. The friction stir welding method for joining two metal members (1) using a primary joining rotary tool (F) with a stirring pin (F2) includes a primary joining process in which a rotating stirring pin (F2) is moved to the butting portion formed by butting the metal members (1) against each other and friction stir welding is carried out. In the primary joining process, only the stirring pin (F2) is brought into contact with the metal members (1).

10 Claims, 37 Drawing Sheets

(56) References Cited

U.S. PATENT DOCUMENTS

| | | | |
|---|---|---|---|
| 6,422,449 B1* | 7/2002 | Ezumi | B23K 20/122 |
| | | | 228/114.5 |
| 6,676,008 B1 | 1/2004 | Trapp et al. | |
| 7,152,776 B2 | 12/2006 | Nelson et al. | |
| 7,281,647 B2 | 10/2007 | Stol et al. | |
| 7,866,532 B1* | 1/2011 | Potter | B23K 20/122 |
| | | | 228/112.1 |
| 8,043,021 B2 | 10/2011 | Birkelbach | |
| 8,544,715 B2 | 10/2013 | Zardus et al. | |
| 8,556,156 B1* | 10/2013 | Bharadwaj | B23K 20/1235 |
| | | | 228/102 |
| 8,579,180 B2 | 11/2013 | Burford | |
| 8,857,696 B1 | 10/2014 | Merah et al. | |
| 2001/0019073 A1* | 9/2001 | Ezumi | B23K 20/123 |
| | | | 228/112.1 |
| 2002/0190100 A1 | 12/2002 | Duncan, Jr. | |
| 2003/0047587 A1* | 3/2003 | Aono | B23K 20/1265 |
| | | | 228/112.1 |
| 2004/0035914 A1 | 2/2004 | Hempstead | |
| 2004/0074949 A1 | 4/2004 | Narita et al. | |
| 2004/0084506 A1* | 5/2004 | Tanaka | B23K 20/124 |
| | | | 228/112.1 |
| 2004/0149807 A1 | 8/2004 | Schilling et al. | |
| 2004/0232209 A1 | 11/2004 | Stol et al. | |
| 2005/0246884 A1 | 11/2005 | Chen | |
| 2006/0086707 A1* | 4/2006 | Kou | B23K 9/167 |
| | | | 219/137 R |
| 2006/0138198 A1 | 6/2006 | Gendou et al. | |
| 2006/0163327 A1 | 7/2006 | Sunahara et al. | |
| 2007/0187469 A1 | 8/2007 | Chen et al. | |
| 2007/0227102 A1 | 10/2007 | Prataiola | |
| 2008/0149689 A1 | 6/2008 | Maziarz | |
| 2008/0251571 A1 | 10/2008 | Burford | |
| 2008/0257936 A1 | 10/2008 | Trapp et al. | |
| 2008/0308610 A1 | 12/2008 | Watson et al. | |
| 2009/0068492 A1* | 3/2009 | Fujii | B23K 9/173 |
| | | | 428/615 |
| 2009/0072007 A1 | 3/2009 | Nagano | |
| 2009/0148719 A1 | 6/2009 | Bergstrom et al. | |
| 2009/0218033 A1 | 9/2009 | Aota et al. | |
| 2009/0311549 A1 | 12/2009 | Fernandez et al. | |
| 2010/0081005 A1 | 4/2010 | Aoh et al. | |
| 2010/0089977 A1* | 4/2010 | Chen | B23K 20/122 |
| | | | 228/114.5 |
| 2010/0096438 A1* | 4/2010 | Sato | B23K 20/1225 |
| | | | 228/114 |
| 2010/0101768 A1* | 4/2010 | Seo | B23K 20/122 |
| | | | 165/168 |
| 2010/0279146 A1 | 11/2010 | Rowe et al. | |
| 2010/0282822 A1 | 11/2010 | Nagano | |
| 2010/0314075 A1* | 12/2010 | Takahashi | B23K 20/122 |
| | | | 165/104.19 |
| 2011/0308059 A1* | 12/2011 | Seo | B23K 20/1265 |
| | | | 29/428 |
| 2012/0052322 A1 | 3/2012 | Hatakeyama et al. | |
| 2012/0193401 A1* | 8/2012 | Hori | B23K 20/1265 |
| | | | 228/112.1 |
| 2012/0318848 A1 | 12/2012 | Adachi et al. | |
| 2012/0325896 A1 | 12/2012 | Sato et al. | |
| 2012/0325897 A1 | 12/2012 | Sato et al. | |
| 2013/0233910 A1 | 9/2013 | Sato et al. | |
| 2013/0299561 A1* | 11/2013 | Higgins | B23K 20/129 |
| | | | 228/114 |
| 2014/0007982 A1* | 1/2014 | Prest | B23K 31/02 |
| | | | 148/403 |
| 2014/0027496 A1* | 1/2014 | Castillo | B23K 20/12 |
| | | | 228/102 |

FOREIGN PATENT DOCUMENTS

| | | |
|---|---|---|
| JP | 10-202374 A | 8/1998 |
| JP | 11-010368 A | 1/1999 |
| JP | 11-047961 A | 2/1999 |
| JP | 11-050266 A | 2/1999 |
| JP | 11-090655 A | 4/1999 |
| JP | 11-320128 A | 11/1999 |
| JP | 2000-141066 A | 5/2000 |
| JP | 2001-321965 A | 11/2001 |
| JP | 2002-059289 A | 2/2002 |
| JP | 2002-512130 A | 4/2002 |
| JP | 3296417 B2 * | 7/2002 ........... B23K 20/123 |
| JP | 2002-224861 A | 8/2002 |
| JP | 2003-001440 A | 1/2003 |
| JP | 2003-001441 A | 1/2003 |
| JP | 2003-120415 A | 4/2003 |
| JP | 2003-311441 A | 11/2003 |
| JP | 2003-326374 A | 11/2003 |
| JP | 2004-167498 A | 6/2004 |
| JP | 2004-358535 A | 12/2004 |
| JP | 2005-111533 A | 4/2005 |
| JP | 2005-131666 A | 5/2005 |
| JP | 2006-239734 A | 9/2006 |
| JP | 2007-061875 A | 3/2007 |
| JP | 2008-87036 A | 4/2008 |
| JP | 2008-284607 A | 11/2008 |
| JP | 2008-290093 A | 12/2008 |
| JP | 2008-302421 A | 12/2008 |
| JP | 2008302422 A | 12/2008 |
| JP | 2009-136881 A | 6/2009 |
| JP | 2009-148811 A | 7/2009 |
| JP | 2009-148821 A | 7/2009 |
| JP | 2009172653 A | 8/2009 |
| JP | 2009-220138 A | 10/2009 |
| JP | 2010-017739 A | 1/2010 |
| JP | 2010-82649 A | 4/2010 |
| JP | 2010-089147 A | 4/2010 |
| JP | 2010-125495 A | 6/2010 |
| JP | 2010-188367 A | 9/2010 |
| JP | 2010-194545 A * | 9/2010 |
| JP | 2010-201441 A | 9/2010 |
| JP | 2010-274320 A | 12/2010 |
| JP | 2010-284704 A | 12/2010 |
| JP | 2010-284706 A | 12/2010 |
| JP | 2011041954 A | 3/2011 |
| JP | 2011-079031 A | 4/2011 |
| JP | 2011-115857 A | 6/2011 |
| JP | 2012-020288 A | 2/2012 |
| KR | 1019990083213 A | 11/1999 |
| KR | 10-0711779 61 | 4/2007 |
| KR | 1020100029832 A | 3/2010 |
| TW | 200838634 A | 10/2008 |
| TW | 200906525 A | 2/2009 |
| TW | 200936283 A | 9/2009 |
| TW | I335251 B | 1/2011 |
| WO | 99/54081 A1 | 10/1999 |
| WO | 2007/119343 A1 | 10/2007 |
| WO | 2009/104432 A1 | 8/2009 |

OTHER PUBLICATIONS

Office Action mailed Jan. 6, 2015, issued in corresponding JP Application No. 2011-179586.
Japanese Office Action dated Jun. 3, 2014, for corresponding Japanese Application No. 2011-187916.
Japanese Office Action dated Jun. 3, 2014, for corresponding Japanese Application No. 2011-179586.
International Search Report dated Oct. 30, 2012, corresponding to International Patent Application No. PCT/JP2012/068931 and English translation thereof.
Japanese Notifications of Reasons for Refusal application No. 2015-105166 dated Sep. 29, 2015.
Japanese Office Action application No. 2011-179586 dated Dec. 1, 2015.
Japanese Office Action application No. 2011-187916 dated Dec. 8, 2015.
European Search Report Application No. 12825873.8 dated Nov. 18, 2015.
Taiwanese Office Action application No. 101128545 dated Dec. 9, 2015.
Japanese Notifications of Reasons for Refusal application No.

(56) References Cited

OTHER PUBLICATIONS 2015-090447 dated Aug. 4, 2015.
Korean Office Action dated Sep. 15, 2015.
Pre-trial Re-examination Report dated May 23, 2016, for corresponding Japanese Application No. 2015-090447.
Pre-trial Re-examination Report dated Jun. 1, 2016, for corresponding Japanese Application No. 2015-105166.
Taiwanese Office Action issued in TW corresponding Application No. 101128545, dated Aug. 24, 2016.
Japanese Notification of Reasons for Refusal issued in corresponding JP Application No. 2015-210651 dated Aug. 23,2016.
Korean Decision on Final Rejection issued in corresponding KR Application No. 10-2015-700900 dated Nov. 7, 2016.
Japanese Decision on Final Rejection issued in corresponding JP Application No. 2015-075237 dated Sep. 20, 2016.

* cited by examiner

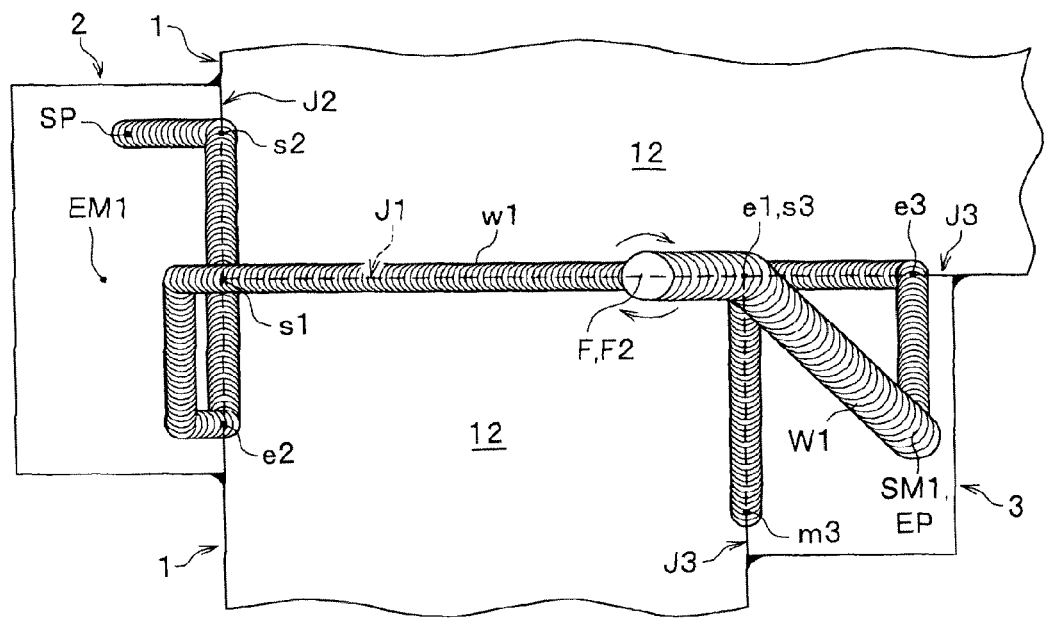
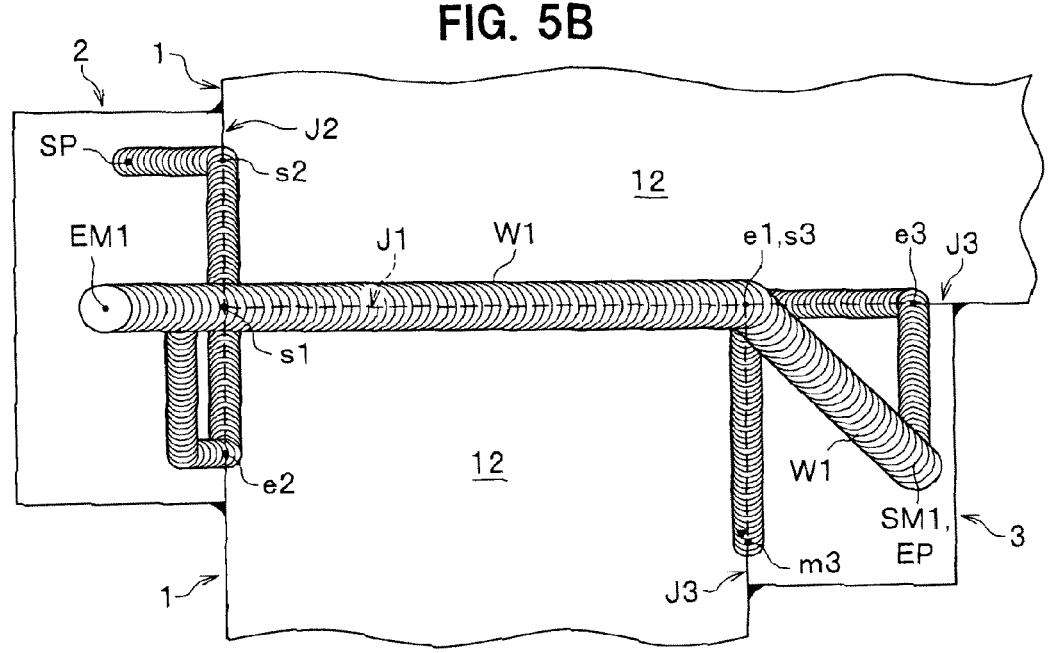

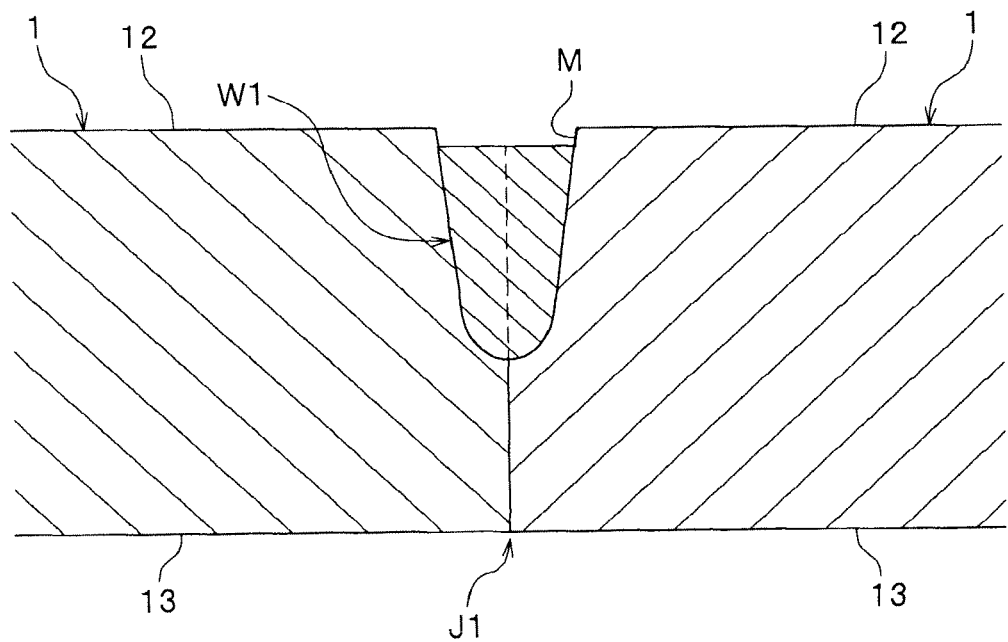
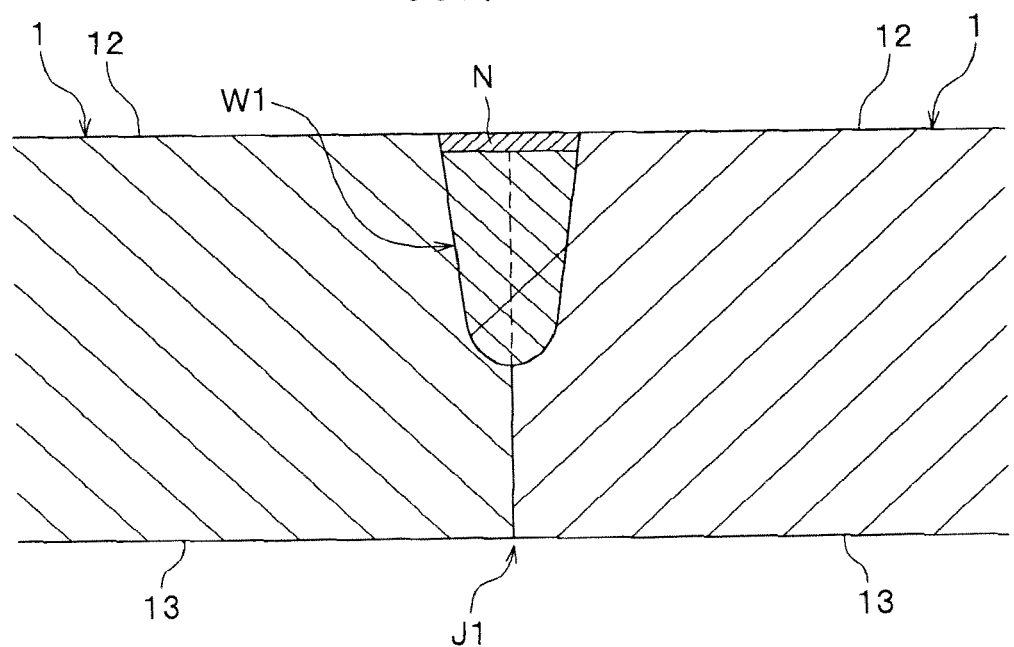

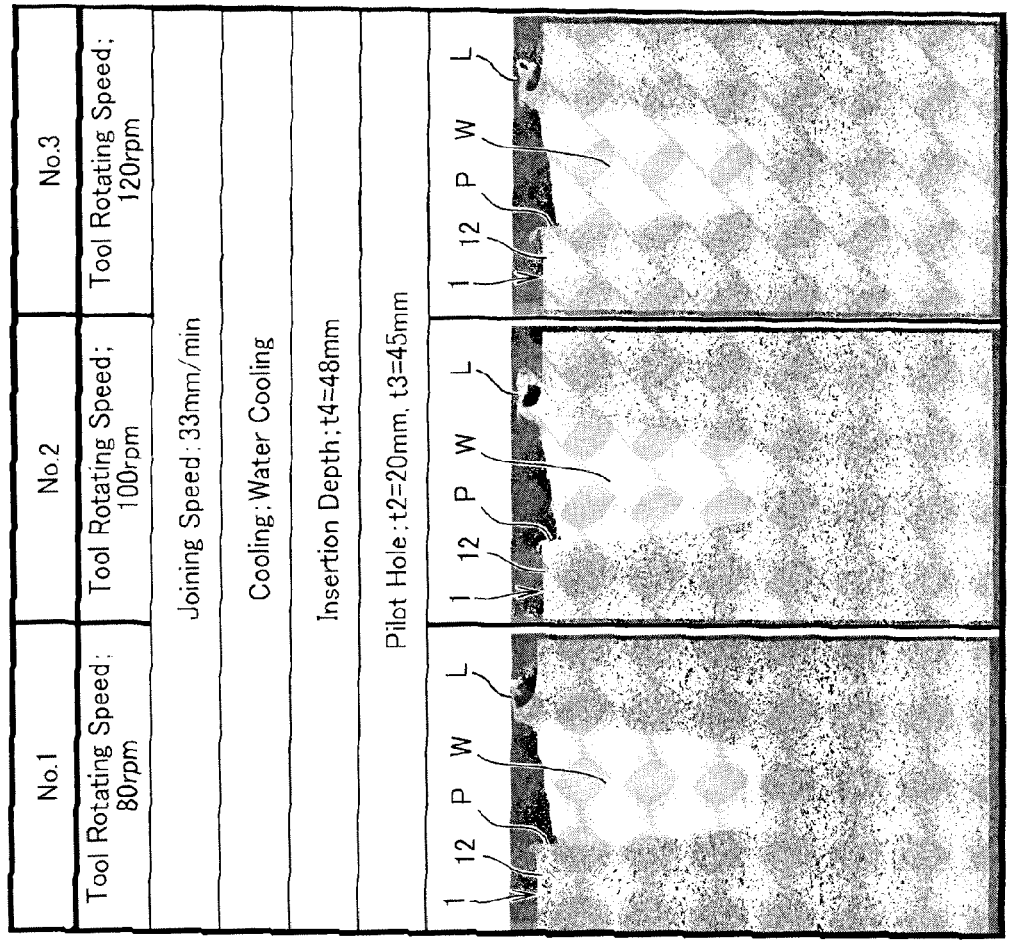

FIG. 17

| | No.4 | No.5 | No.6 | No.7 |
|---|---|---|---|---|
| | Tool Rotating Speed; 120rpm | Tool Rotating Speed; 120rpm | Tool Rotating Speed; 100rpm | Tool Rotating Speed; 80rpm |
| | Joining Speed; 33mm/min | | | |
| | Cooling; Water Cooling | | | |
| | Insertion Depth;t4=75mm | Insertion Depth;t4=70mm | Insertion Depth;t4=70mm | Insertion Depth;t4=70mm |
| | Pilot Hole; t5=35mm, t7=34mm t6=20mm, t8=74mm | Pilot Hole; t5=35mm, t7=20mm t6=20mm, t8=60mm | Pilot Hole; t5=35mm, t7=20mm t6=20mm, t8=60mm | Pilot Hole; t5=35mm, t7=20mm t6=20mm, t8=60mm |

FIG. 19

| No.8 | No.9 | No.10 | No.11 |
|---|---|---|---|
| Tool Rotating Speed; 70rpm | Tool Rotating Speed; 70rpm | Tool Rotating Speed; 70rpm | Tool Rotating Speed; 80rpm |
| Joining Speed; 33mm/min | | | |
| Cooling; Water Cooling Insertion Depth; t4=107mm | | | Water Cooling, Insertion Depth 70mm |
| Pilot Hole; t5=35mm, t7=50mm t6=20mm, t8=50mm | Pilot Hole; t5=35mm, t7=60mm t6=20mm, t8=40mm | Pilot Hole; t5=35mm, t7=65mm t6=20mm, t8=35mm | Pilot Hole; t5=35mm, t7=20mm t6=20mm, t8=40mm |

FIG. 30

FRICTION STIR WELDING METHOD

CROSS REFERENCE TO RELATED APPLICATIONS

This application is a continuation application of U.S. application Ser. No. 14/237,998 filed Feb. 10, 2014, which is a U.S. National Stage application of PCT/JP2012/068931 filed Jul. 26, 2012, which claims the benefit of priority from Japan application No. 2011-187916 filed Aug. 30, 2011, and Japan application No. 2011-179586 filed Aug. 19, 2011, the contents of which applications are incorporated by reference herein.

TECHNICAL FIELD

The present invention relates to a friction stir welding method.

BACKGROUND ART

Patent Document 1 discloses a technology in which, by carrying out a friction stir welding from the front and back surfaces of the butting portion of the metal members in such a way that the plasticized regions formed in the friction stir welding are in contact with each other, the butting portion is joined without a gap. According to this technology, air-tightness and water-tightness of the metal members that are joined together can be enhanced.

On the other hand, Patent Document 2 discloses a technology in which a friction stir welding is carried out by inserting a rotary tool specialized for inner corner friction stir welding into an inner corner of two metal members that are butted against each other orthogonally. FIG. 37 is a cross-sectional view showing a conventional friction stir welding method. In the conventional friction stir welding method, a friction stir welding is carried out by the rotary tool 110 specialized for inner corner friction stir welding at the butting portion J formed by the end surface of the metal member 101 and the side surface of the metal member 102 butted against each other. The rotary tool 110 specialized for inner corner friction stir welding includes a holding block 111 in the shape of a triangle prism, a stirring pin 112 which is rotatable relative to this holding block 111 while penetrating through the holding block 111. In joining, the stirring pin 112 is rotated, while the holding block 111 is in contact with respective side surfaces of the metal members 101, 102.

PRIOR TECHNICAL DOCUMENT

Patent Document

[Patent Document 1] Japanese Patent Application Laid-Open Publication No. 2008-87036
[Patent Document 2] Japanese Patent Application Laid-Open Publication No. hei 11-320128

SUMMARY OF THE INVENTION

Technical Problem

When joining the metal plate members of large thickness by the conventional joining method, it is necessary to increase the length and the outer diameter of the stirring pin. Further, along with this upsizing, it is necessary to elongate the outer diameter of the shoulder portion. However, there is a problem in which, when the outer diameter of the shoulder portion becomes larger, the friction between the metal members and the shoulder portion increases, and thus the load exerted on the friction stirring apparatus increases. This makes it difficult to carry out the joining of the metal members, especially of large plate thickness, at a deep location thereof.

On the other hand, in the conventional friction stir welding for joining the inner corner portion of the metal members, when the joining is carried out, the holding block 111 is pressed against the metal members 101, 102 as shown in FIG. 37, and therefore the metal members 101, 102 can be scraped off by the holding block 111. In addition, the presence of the holding block 111 prevents visual observation of the joining part.

In addition, as shown in FIG. 37, one can conceive that, before joining the metal members 101, 102 together at the inner corner thereof, a provisional joining may be carried out from the surface forming the outer corner. If the thicknesses of the metal members 101, 102 are large, there is a problem that a gap occurs between the plasticized region Wa formed by the provisional joining and the plasticized region Wb formed at the inner corner.

From this point of view, an object of the present invention is to provide a friction stir welding method that enables the joining to be carried out down to a deep location in the butting portion, by reducing the load exerted on the friction stirring apparatus. In addition, another object of the present invention is to provide a friction stir welding method that reduces damages on the metal members in the time of joining and joins the metal members preferably.

Solution to Problem

To achieve the object, the present invention is a method of friction stir welding for joining two metal members together using a rotary tool including a stirring pin, comprising a primary joining process for inserting the stirring pin in a rotating state into a butting portion of the metal members and carrying out friction stir welding with only the stirring pin contacting with the metal members.

According to the method, by limiting the parts contacting with the metal members only to the stirring pin, the friction between the metal members and the rotary tool, and thus the load exerted on the friction stirring apparatus, can be reduced as compared to the conventional friction stir welding method in which the shoulder is pushed onto the metal members. That is, in the present invention, the stirring pin can be inserted into a deep location in the metal members, and thus even metal members having a large plate thickness can be joined together down to a deep location.

Moreover, a method of friction stir welding for joining two metal members together using a rotary tool including a stirring pin comprises a primary joining process for inserting the stirring pin in a rotating state into a butting portion of the metal members and carrying out friction stir welding with only the stirring pin contacting with the metal members, the primary joining process comprising: a first primary joining process for carrying out friction stir welding from a front surface of the metal members; and a second primary joining process for carrying out friction stir welding from a back surface of the metal members; wherein a plasticized region formed in the first primary joining process and a plasticized region formed in the second primary joining process adjoin each other.

According to the method, by limiting parts contacting with the metal members only to the stirring pin, the friction between the metal members and the rotary tool and thus the load exerted on the friction stirring apparatus can be reduced as compared to the conventional friction stir welding method in which the shoulder is pushed onto the metal members. That is, in the present invention, because the stirring pin can be inserted into a deep location in the metal members, even metal members having a large plate thickness can be joined together down to a deep location. Moreover, because the friction stir welding can be carried out over the entire length in thickness direction of the butting portion, the air-tightness and water-tightness can be enhanced.

Moreover, it is preferred to carry out buildup welding on a plasticized region formed in the primary joining process. According to the method, the insufficient amount of metal due to the primary joining process can be replenished.

Moreover, it is preferred to carry out a disposing process for disposing a refill member on the plasticized region formed in the primary joining process, and a refill member joining process for joining the refill member to the metal members. According to the method, the insufficient amount of metal due to the primary joining process can be replenished.

Moreover, it is preferred that the method includes a provisional joining process for joining the metal members together provisionally before carrying out the primary joining process. According to the method, when the primary joining process is carried out, the metal members are prevented from separating away from each other.

Moreover, it is preferred to dispose a tab member in the vicinity of the butting portion, form a pilot hole in the tab member, and then insert the stirring pin into the pilot hole to carry out the primary joining process. According to the method, the press-fitting resistance in pushing the rotary tool into the metal members can be reduced.

Moreover, the present invention is a method of friction stir welding for joining two metal members together using a rotary tool including a stirring pin, comprising: a butting process for butting the metal members against one another with an angle therebetween in order to form a butting portion; and a primary joining process for inserting the stirring pin in a rotating state into an inner corner of the metal members and carrying out friction stir welding on the butting portion with only the stirring pin contacting with the both metal members.

Moreover, the present invention is a method of friction stir welding for joining two metal members together using a rotary tool including a stirring pin, comprising: a butting process for butting the metal members against one another with an angle therebetween in order to form a butting portion; a first primary joining process for inserting the stirring pin in a rotating state into an inner corner of the metal members and carrying out friction stir welding on the butting portion with only the stirring pin contacting with the both metal members; and a second primary joining process for inserting the stirring pin in a rotating state into a surface forming an outer corner of the metal members and carrying out friction stir welding on the butting portion with only the stirring pin contacting with the both metal members.

According to the method, because only the stirring pin contacts with the metal members, the damage on the side surfaces of the metal members can be reduced while the metal members are joined together. Moreover, because a conventional holding block is not used for the rotary tool, the joining portion can be observed visually. Thus, the operation can be facilitated.

Moreover, it is preferred that a plasticized region formed in the first primary joining process and a plasticized region formed in the second primary joining process overlap each another. According to the method, a gap of the butting portion is eliminated, and thus the air-tightness and water-tightness can be enhanced.

Moreover, it is preferred that, in the butting process, a side surface of one metal member is butted against an end surface of the other metal member, with an angle $\alpha$ at an inner corner formed by the side surface of the one metal member and a side surface of the other metal member, and in the first primary joining process, a rotation center axis of the rotary tool inserted into an intersection line of the side surfaces is positioned between an imaginary reference surface and the side surface of the one metal member, the imaginary reference surface passing through the intersection line and forming an angle $\alpha/2$ with the side surfaces.

According to the method, by inclining the rotary tool toward either one of the metal members, a stirring pin can be inserted into a deep location in the butting portion, and thus the joining can be carried out down to a deep location in the butting portion.

Moreover, it is preferred to include a provisional joining process for, before the primary joining process, inserting a rotary tool in a rotating state into a surface forming an outer corner of the metal members and joining the butting portion provisionally. According to the joining method, when the primary joining process is carried out, the metal members can be prevented from separating away from each other.

Moreover, in the primary joining process, it is preferred that the plasticized region formed in the primary joining process overlaps the plasticized region formed in the provisional joining process. According to the joining method, by overlapping the plasticized regions one another, a gap at the butting portion is eliminated, and thus the air-tightness and water-tightness can be enhanced.

Moreover, it is preferred to carry out buildup welding on a plasticized region formed in the primary joining process. According to the method, the insufficient amount of metal due to the primary joining process can be replenished.

Advantageous Effects of Invention

According to the friction stir welding method of the present invention, the joining is carried out down to deep part of the butting portion, by reducing the load exerted on the friction stirring apparatus. Moreover, according to the friction stir welding method of the present invention, the damage of the metal members during joining is reduced and the joining is carried out preferably.

BRIEF DESCRIPTION OF THE DRAWINGS

FIG. 5A is a plan view showing the first primary joining process of the first embodiment during joining, and FIG. 5B is a plan view showing the first primary joining process of the first embodiment at its end.

FIG. 10A is a view showing the milling process of a variant of the repairing process, and FIG. 10B is a view showing the buildup welding process of a variant of the repairing process.

FIG. 15 shows conditions and sectional views of respective plasticized regions of working example 1.

FIG. 17 shows conditions and sectional views of respective plasticized regions of working example 2.

FIG. 19 shows conditions and sectional views of respective plasticized regions of working example 3.

FIG. 30 is sectional views showing the results of working example 6, where the rotating speed of primary joining rotary tool B-1 is set to 1000 rpm, and the joining speed is set to 100 mm/min, 200 mm/min, 300 mm/min, and 500 mm/min.

DETAILED DESCRIPTION OF THE EMBODIMENT

[First Embodiment]

The first embodiment of the present invention will be described in detail with reference to the figures. First, a primary joining rotary tool and a provisional joining rotary tool used in the present embodiment will be described.

Figure 1A:
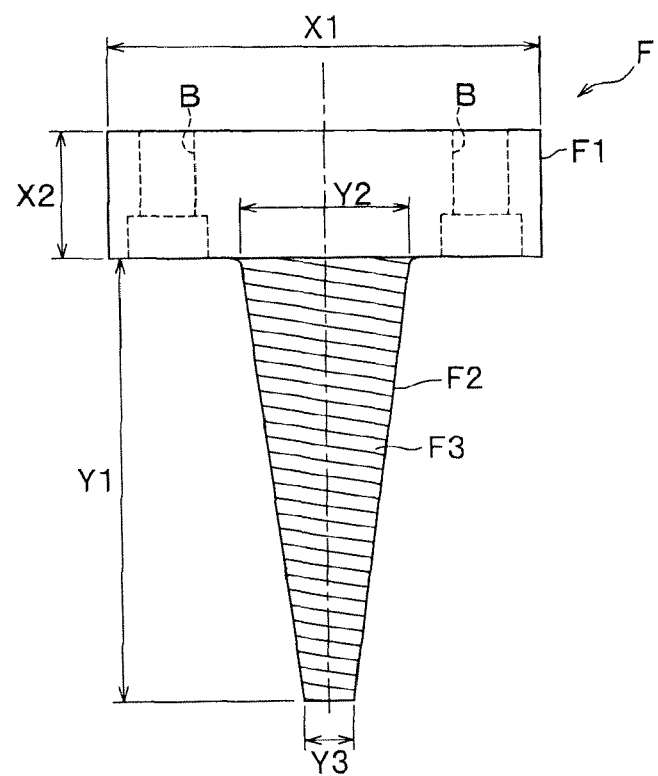
FIG. 1A is a side view showing the primary joining rotary tool of the first embodiment.

As shown in FIG. 1A, the primary joining rotary tool is made up of a connection portion F1 and a stirring pin F2. The primary joining rotary tool F is formed, for example, of a tool steel. The connection portion F1 is a portion that is to be connected to a rotary shaft D of a friction stirring apparatus shown in FIG. 1B. The connection portion F1 has a cylindrical shape, and includes bolt holes B, B formed therein, to which bolts are fastened.

The stirring pin F2 hangs down from the connection portion F1, and is coaxial with the connection portion F1. The stirring pin F2 tapers off as it is away from the connection portion F1. A spiral groove F3 is engraved on the outer circumferential surface of the stirring pin F2.

Figure 1B:
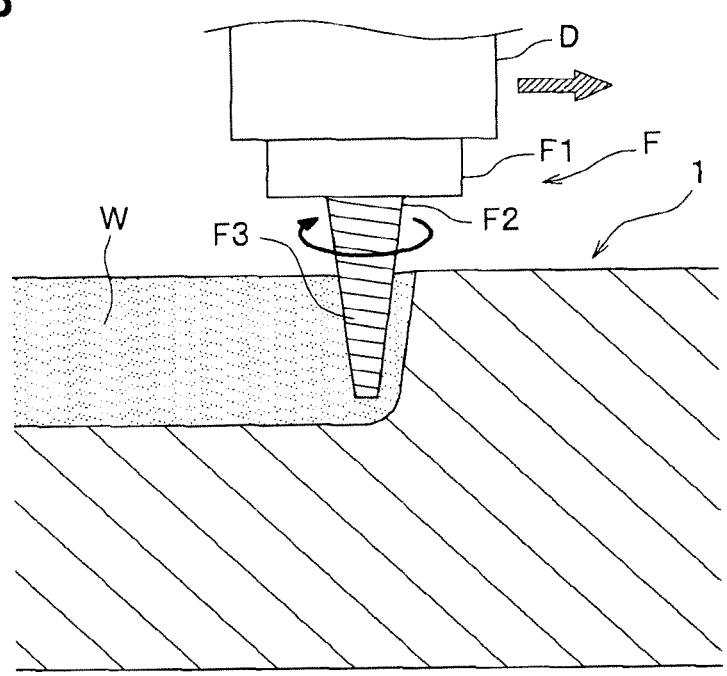
FIG. 1B is a schematic sectional view showing the joining scheme of the primary joining rotary tool.

As shown in FIG. 1B, when the friction stir welding is carried out by means of the primary joining rotary tool F, the primary joining rotary tool F is moved in such a manner that only the stirring pin F2 in a rotating state is inserted into the metal members 1 and the connection portion F2 is kept away from the metal members 1. In other words, the friction stir welding is carried out in a condition where the base end portion of the stirring pin F2 is taken out of the friction-stirred metal. Along the movement path of the primary joining rotary tool F, a plasticized region W is formed after the friction-stirred metal hardens.

Figure 2A:
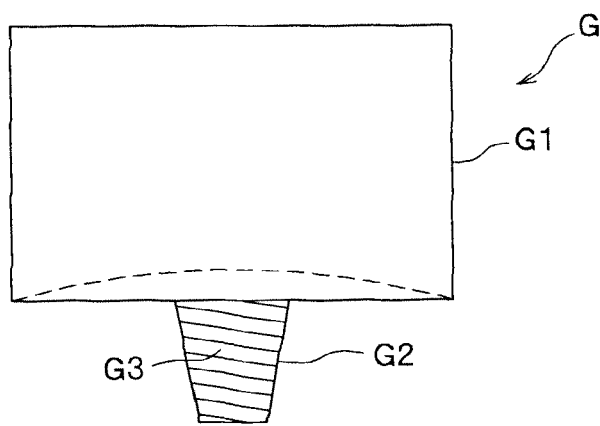
FIG. 2A is a side view showing the provisional joining rotary tool of the first embodiment.

As shown in FIG. 2A, the provisional joining rotary tool G is made up of a shoulder portion G1 and a stirring pin G2.

Figure 2B:
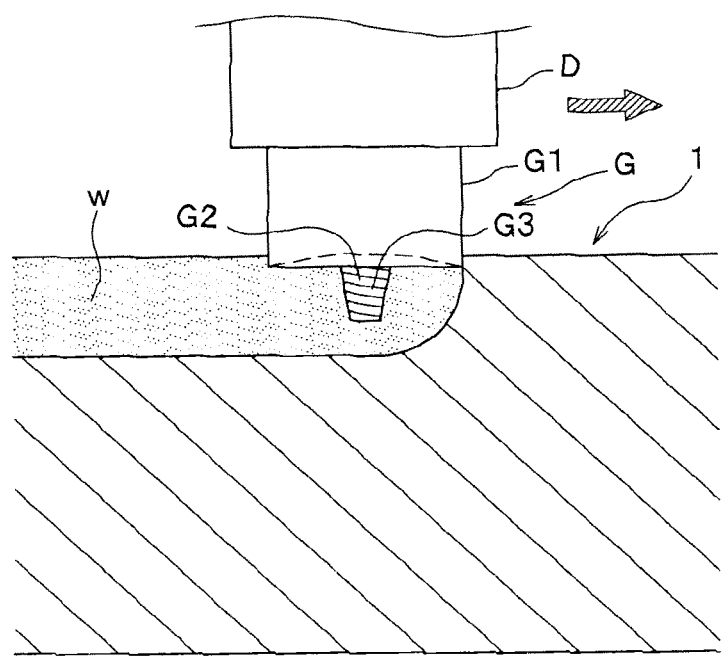
FIG. 2B is a schematic sectional view showing the joining scheme of the provisional joining rotary tool.

The provisional joining rotary tool G is formed, for example, of a tool steel. As shown in FIG. 2B, the shoulder portion G1 is a portion that is to be connected to the rotary shaft D of the friction stirring apparatus as well as a portion to press the metal that is plasticized and fluidized. The shoulder portion G1 has a cylindrical shape. The lower end surface of the shoulder portion G1 is concaved to prevent the fluidized metal from flowing outward.

The stirring pin G2 hangs down from the shoulder portion G1, and is coaxial with the shoulder portion G1. The stirring pin G2 tapers off as it is away from the shoulder portion G1, the stirring pin G2 has a spiral groove G3 engraved on the outer circumferential surface thereof.

As shown in FIG. 2B, when the friction stir welding is carried out by means of the provisional joining rotary tool G, the stirring pin G2 and the lower end of the shoulder portion G1, which are in a rotating state, are inserted into the metal member 1 and moved. Along the movement path of the provisional joining rotary tool G, a plasticized region w is formed after the friction-stirred metal hardens.

Next, the friction stir welding method specific to the present embodiment will be described. The present embodiment includes (1) a preparation process, (2) a first preliminary process, (3) a first primary joining process, (4) a first repairing process, (5) a second preliminary process, (6) a second primary joining process, and (7) a second repairing process. The first preliminary process, the first primary joining process and the first repairing process are the processes that are carried out from the front surfaces of the metal members 1. The second preliminary process, the second primary joining process and the second repairing process are the processes that are carried out from the back surfaces of the metal members 1.

(1) Preparation Process

Figure 3A:
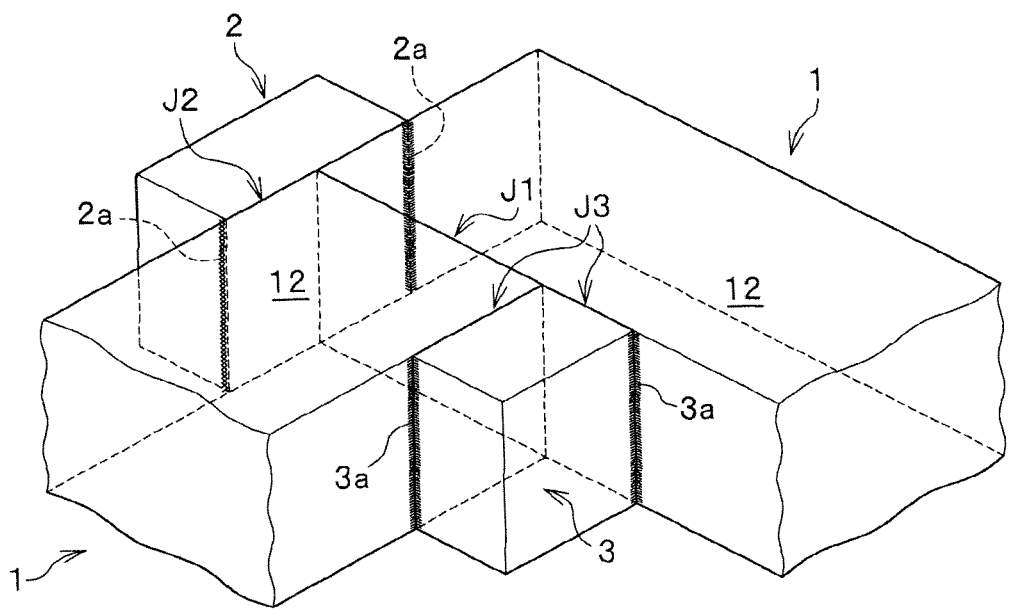
FIG. 3A is a perspective view showing the preparation process of the first embodiment.
Figure 3B:
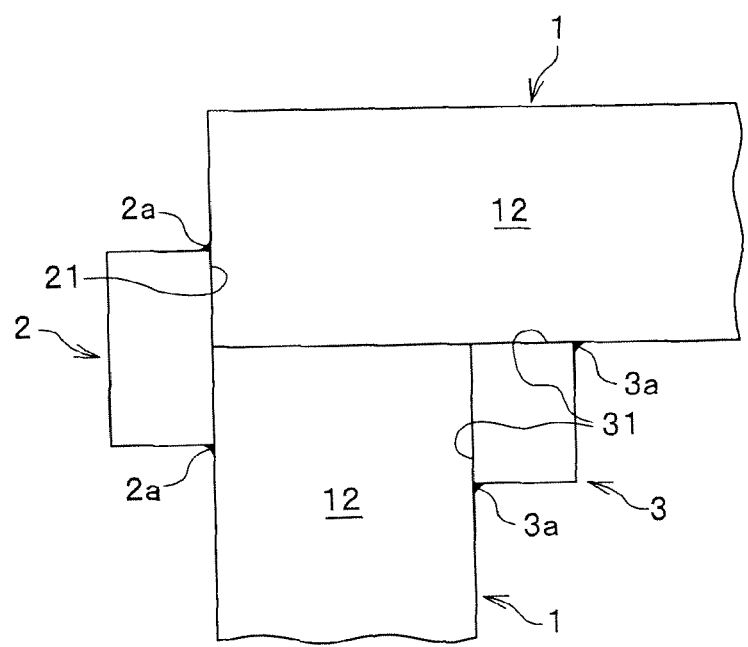
FIG. 3B is a plan view showing the preparation process of the first embodiment.

The preparation process will be explained with reference to FIG. 3. In the present embodiment, the preparation process includes: a butting process for butting the metal members 1, 1 which are to be joined against each other; a tab member disposing process for disposing a first tab member 2 and a second tab member 3 on both sides of the butting portion J1 of the metal members 1, 1; and a welding process for joining provisionally the first tab member 2 and the second tab member 3 to the metal members 1, 1 by welding.

In the butting process, the metal members 1, 1 to be joined are arranged to form an L-shape, and a side surface of one metal member 1 is brought into contact with an end surface of the other metal member 1 without a gap therebetween. The metal members 1 need to be a metal capable of being stirred by friction, and in the present embodiment an aluminum alloy is used.

In the tab member disposing process, the first tab member 2 is located on one peripheral side (outer side) of the butting portion J1 of the metal members 1, 1 so as to bring a contact surface 21 (refer to FIG. 3B) of the first tab member 2 into contact with the side surface of the outer side of the metal members 1, 1. Also, the second tab member 3 is located on the opposite peripheral side of the butting portion J1 so as to bring the contact surfaces 31, 31 (refer to FIG. 3B) of the second tab member 3 into contact with the side surfaces of the inner side of the metal members 1, 1. It should be noted that, if the metal members 1, 1 are combined in a L-shape, one of the first tab member 2 and the second tab member 3 (in the present embodiment, the second tab member 3) is located at the inner corner portion formed by the metal members 1, 1 (the corner formed by the side surfaces of the inner side of the metal members 1, 1).

In the welding process, the metal members 1 and the first tab member 2 are joined together by welding inner corner portions 2a, 2a formed by the metal members 1 and the first tab member 2. Also, the metal members 1 and the second tab member 3 are joined together by welding inner corner portions 3a, 3a formed by the metal members 1 and the second tab member 3.

After the preparation process, the metal members 1, 1, the first tab member 2 and the second tab member 3 are placed on a platform of the friction stirring apparatus (not shown), and are unmovably fixed using a jig such as a clamp (not shown).

(2) First Preliminary Process

The first preliminary process includes: a first tab member joining process for joining the metal members 1, 1 with the first tab member 2 at the butting portion J2 therebetween; a provisional joining process for provisionally joining the metal members 1, 1 together at the butting portion J1 therebetween; a second tab member joining process for joining the metal members 1, 1 with the second tab member 3 at the butting portion J3 therebetween; and a pilot hole forming process for forming a pilot hole at a starting position of the friction stirring in the first primary joining process.

Figure 4A:
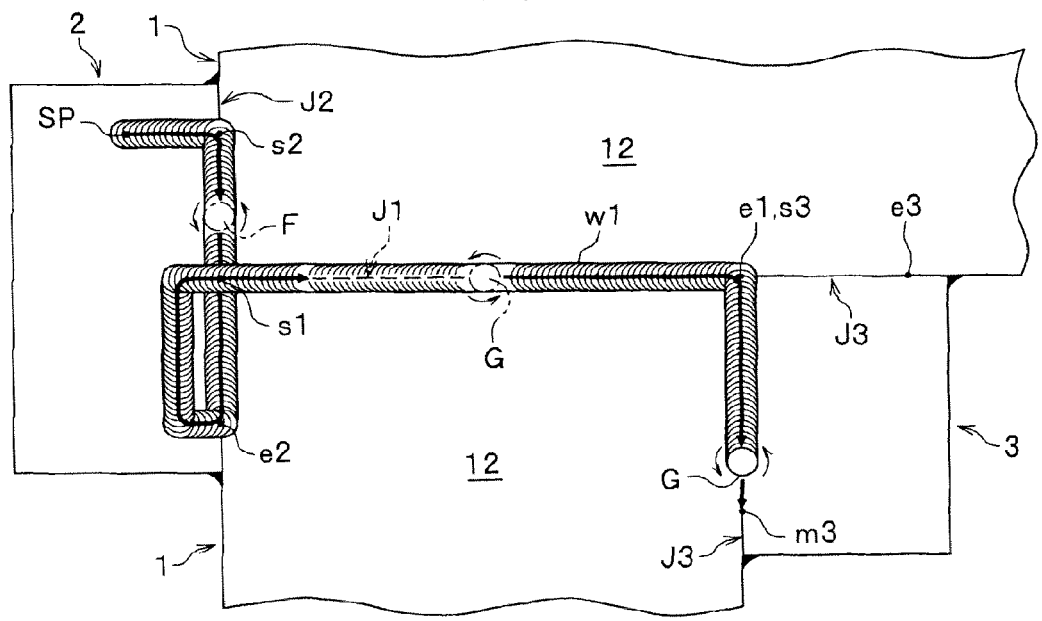
FIG. 4A is a plan view showing the first preliminary process of the first embodiment during joining.
Figure 4B:
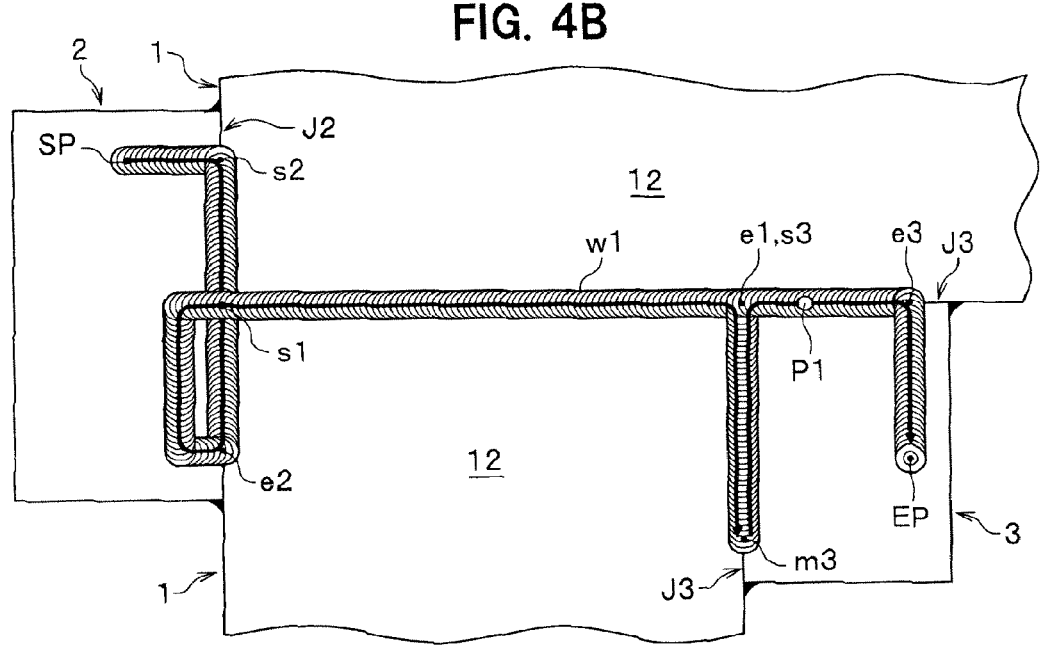
FIG. 4B is a plan view showing the first preliminary process of the first embodiment at its end.

As shown in FIGS. 4A and 4B, a single provisional joining rotary tool G is moved to form a movement path (bead) with a single stroke in order to carry out the friction stirring continuously on the butting portions J1, J2, J3.

First, the stirring pin G2 of the provisional joining rotary tool G, which is rotating counterclockwise, is inserted into a starting position SP which is set where appropriate in the first tab member 2, in order to start the friction stirring. Then, the provisional joining rotary tool G is relatively moved toward the starting point s2 of the first tab member joining process.

After the friction stirring is carried out continuously to the starting point s2 of the first tab member joining process by relatively moving the provisional joining rotary tool G, the first tab member joining process starts without pulling out the provisional joining rotary tool G at the starting point s2.

In the first tab member joining process, a friction stirring is carried out on the butting portion J2 between the first tab member 2 and the metal members 1, 1. Specifically, the friction stirring is carried out on the butting portion J2, by setting a route of the friction stirring on the seam between the metal members 1, 1 and the first tab member 2 and relatively moving the provisional joining rotary tool G along the route. In the present embodiment, the friction stirring is carried out continuously from the starting point s2 to the ending point e2 of the first tab member joining process, without pulling out the provisional joining rotary tool G midway.

If the provisional joining rotary tool G is rotated counterclockwise, microscopic joining defects might occur on the right side in the traveling direction. Thus, it is preferred that the positions of the starting point s2 and the ending point e2 of the first tab member joining process are set in such a manner that the metal members 1, 1 are positioned on the left side in the traveling direction of the provisional joining rotary tool G. This makes it difficult for the joining defects to occur in the metal members 1, and thus enables a high quality joining body to be obtained.

When the provisional joining rotary tool G reaches the ending point e2 of the first tab member joining process, the friction stirring is not finished at the ending point e2 but continued to the starting point s1 of the provisional joining process, and the provisional joining process starts without interruption. In the present embodiment, the route of the friction stirring from the ending point e2 of the first tab member joining process to the starting point s1 of the provisional joining process is set in the first tab member 2.

In the provisional joining process, the friction stirring is carried out on the butting portion J1 of the metal members 1, 1. Specifically, the friction stirring is carried out on the butting portion J1, by setting a route of the friction stirring on a seam between the metal members 1, 1 and relatively moving the provisional joining rotary tool G along the route. In the present embodiment, the friction stirring is carried out continuously from the starting point s1 to the ending point e1 of the provisional joining process without pulling out the provisional joining rotary tool G midway.

When the provisional joining rotary tool G reaches the ending point e1 of the provisional joining process, the second tab member joining process is started without interruption. In other words, the second tab member joining process is started without pulling out the provisional joining rotary tool G at the ending point e1 of the provisional joining process, which is the starting point s3 of the second tab member joining process as well.

In the second tab member joining process, the friction stirring is carried out on the butting portions J3, J3 between the metal members 1, 1 and the second tab member 3. In the present embodiment, the starting point s3 of the second tab member joining process is positioned at a middle point of the butting portions J3, J3. Thus, the friction stirring is carried out continuously from the starting point s3 to the ending point e3 of the second tab member joining process, by setting a turnaround point m3 on a route of friction stirring from the starting point s3 to the ending point e3 of the second tab member joining process, and moving the provisional joining rotary tool G from the starting point s3 to the turnaround point m3 (refer to FIG. 4A) and then from the turnaround point m3 to the ending point e3 (refer to FIG. 4B). In other words, the friction stirring is carried out continuously from the starting point s3 to the ending point e3 of the second tab member joining process, by moving the provisional joining rotary tool G forward and backward between the starting point s3 and the turnaround point m3 and then to the ending point e3. Here, the route of the friction stirring from the starting point s3 to the turnaround point m3 and the route of the friction stirring from the turnaround point m3 to the ending point e3 are respectively set on the seam between the metal members 1 and the second tab member 3.

Although there is no limitation to a positional relationship between the starting point s3, the turnaround point m3 and the ending point e3, it is desirable that, if the provisional joining rotary tool G is rotated counterclockwise as in the present embodiment, the positions of the starting point s3, the turnaround point m3 and the ending point e3 of the second tab member joining process are set in such a manner that the metal members 1, 1 are positioned on the left side in the traveling direction of the provisional joining rotary tool G at least along the route of friction stirring from the turnaround point m3 to the ending point e3. In this case, it is desirable that, in the forward path as well as the backward path between the starting point s3 and the turnaround point m3, a route is set on the seam between the metal member 1 and the second tab member 3, and the provisional joining rotary tool is moved along the route. In this way, even if the metal member 1 is positioned on the right side in the traveling direction of the provisional joining rotary tool G during its movement from the starting point s3 to the turnaround point m3 and the joining defects occur on the side of the metal member 1, the metal member 1 is positioned on the left side in the traveling direction of the provisional joining rotary tool G during the subsequent friction stirring from the turnaround point m3 to the ending point e3, and thus the aforementioned joining defects are eliminated and a high quality joining body can be obtained.

It should be noted that, if the provisional joining rotary tool G is rotated clockwise, it is desirable that the positions of the starting point, the turnaround point and the ending point of the second tab member joining process are set in such a manner that the metal members 1, 1 are positioned on the right side in the traveling direction of the provisional joining rotary tool G along the route of friction stirring from the turnaround point to the ending point. Specifically, although not shown in figures, a turnaround point may be set at the position of the ending point e3 that is set when the provisional joining rotary tool G rotates counterclockwise, and an ending point may be set at the position of the turnaround point m3 that is set when the provisional joining rotary tool G rotates counterclockwise.

As shown in FIG. 4B, if the provisional joining rotary tool G reaches the ending point e3 of the second tab member joining process, the friction stirring is continued to a complete position EP which is set in the second tab member 3, without finishing the friction stirring at the ending point e3. If the provisional joining rotary tool G reaches the complete position EP, the stirring pin G2 is pulled out of the complete position EP by rotating and uplifting the provisional joining rotary tool G.

Subsequently, the pilot hole forming process is carried out. The pilot hole forming process is a process to form a pilot hole at the starting position of the friction stirring in the first primary joining process. Although a new pilot hole may be formed, in the present embodiment a pilot hole is formed by expanding the diameter of the pull-out hole formed when pulling out the stirring pin G2 of the provisional joining rotary tool G by means of a drill or the like. This enables the pilot hole machining operation to be skipped or simplified, and thus shortens the operation time. It should be noted that the aforementioned pull-out hole may be used as it is as the pilot hole.

(3) First Primary Joining Process

If the first preliminary process is completed, the first primary joining process is carried out to join the metal members 1, 1 together firmly at the butting portion J1. In the first primary joining process according to the present embodiment, the friction stirring is carried out on the butting portion J1 which is provisionally joined, from the front surface of the metal members 1, by means of the primary joining rotary tool F shown in FIG. 1A.

In the first primary joining process, as shown in FIG. 5, the friction stirring is started by rotating clockwise the primary joining rotary tool F and inserting the stirring pin F2 into the starting position SM1 (i.e., the complete position EP shown in FIG. 4B).

The friction stirring is carried out to one end of the butting portion J1 of the metal members 1, 1, and then without interruption the primary joining rotary tool F is moved into the butting portion J1 and is relatively moved along a route of friction stirring which is set on the seam of the metal members 1, 1, so that the friction stirring is carried out continuously from one end to the other end of the butting portion J1. Here, as shown in FIG. 1B, only the stirring pin F2 is inserted into the butting portion J1, with the connection portion F1 of the primary joining rotary tool F kept away from the metal members 1. As shown in FIG. 5B, after the primary joining rotary tool F is relatively moved to the other end of the butting portion J1, the primary joining rotary tool F is moved across the butting portion J2, and without interruption relatively moved toward the complete position EM1, while carrying out the friction stirring.

When the primary joining rotary tool F reaches the complete position EM1, the primary joining rotary tool F is uplifted, while rotating, in order to pull out the stirring pin F2 from the complete position EM1. When the stirring pin F2 is pulled out upward at the complete position EM1, a pull-out hole of a substantially same shape as the stirring pin F2 is formed inevitably, but in the present embodiment it is left there as it is.

(4) First Repairing Process

When the first primary joining process is completed, the first repairing process is initiated on the plasticized region W1 formed in the metal members 1 by the first primary joining process. In the first repairing process according to the present embodiment, as shown in FIG. 6 and FIG. 7, a depressed groove forming process for forming a depressed groove M, a disposing process for disposing a refill member 4 at the depressed groove M, and a refill member joining process for joining the metal members 1 with the refill member 4 are carried out.

Figure 6:
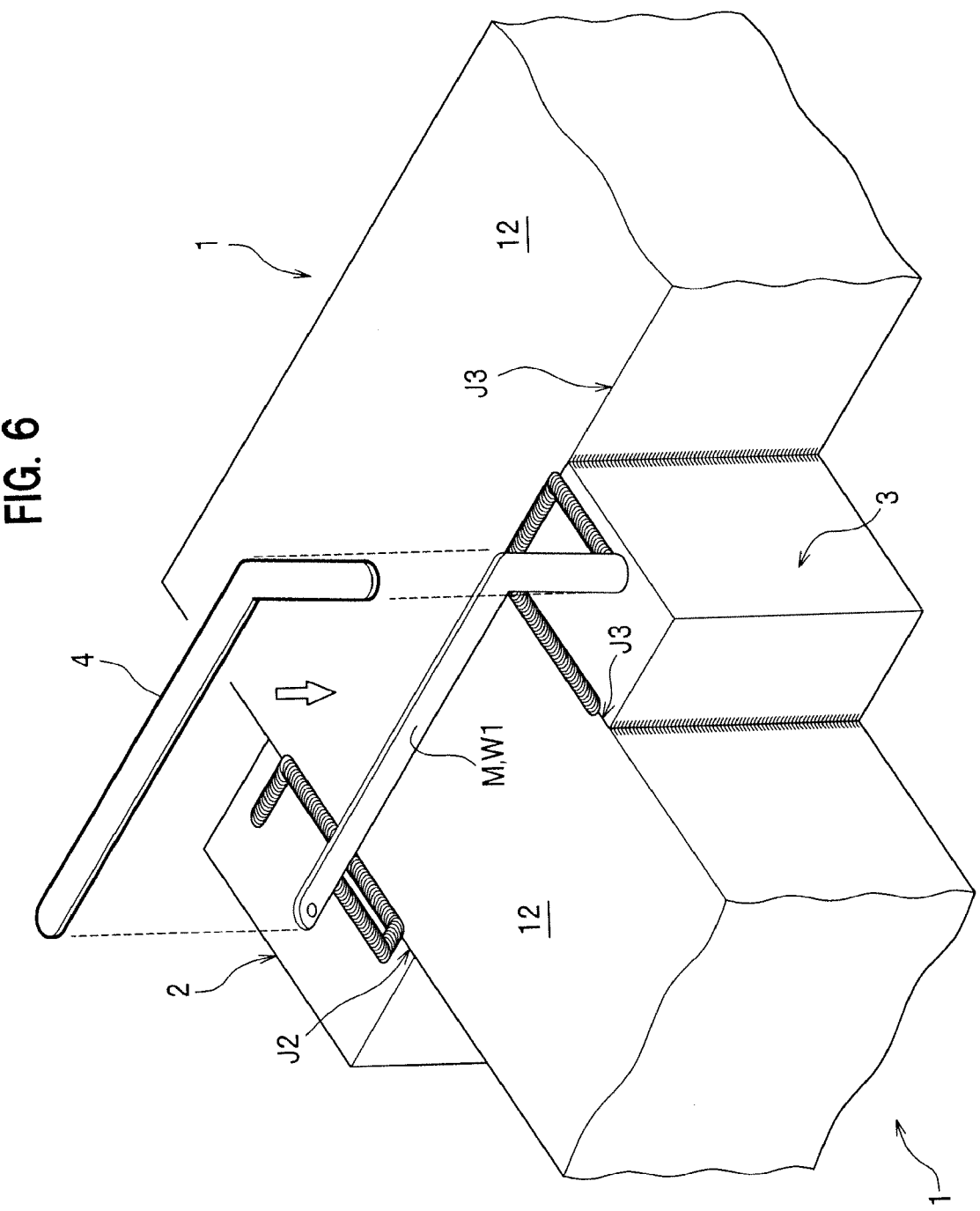
FIG. 6 is a perspective view showing the first repairing process of the first embodiment.

In the depressed groove forming process, as shown in FIG. 6, the depressed groove M is formed on the front surface of the plasticized region W1 formed during the movement of the primary joining rotary tool F. In the depressed groove forming process, the depressed groove M having a rectangular cross-sectional shape is formed by cutting the front surface of the plasticized region W1 and burrs for example by means of an end mill or the like.

In the disposing process, the refill member 4 is fitted in the depressed groove M. The refill member 4 is a metal plate made of a material of the same class as the metal member 1. The refill member 4 has a substantially same shape as the depressed groove M. The thickness of the refill member 4 is substantially same as the depth of the depressed groove M.

Figure 7A:
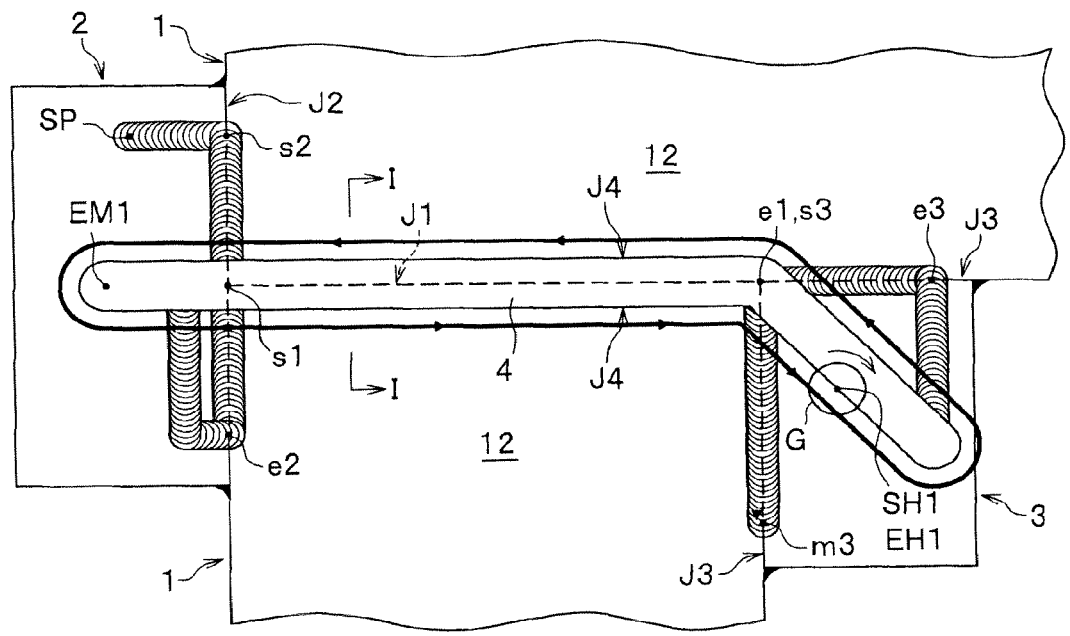
FIG. 7A is a plan view showing the repair member joining process in the first repairing process of the first embodiment.
Figure 7B:
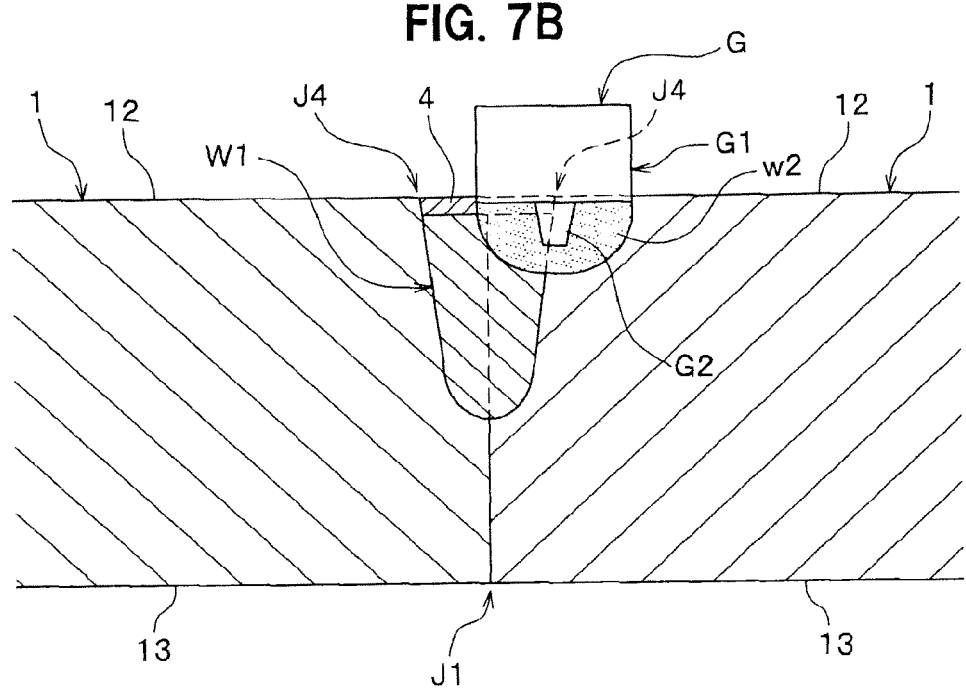
FIG. 7B is a sectional view showing the repair member joining process in the first repairing process of the first embodiment.

In the refill member joining process, as shown in FIG. 7A, the friction stir welding is carried out on the butting portion J4 which is a butting portion of the refill member 4 with the metal members 1, the first tab member 2 and the second tab member 3. Specifically, the provisional joining rotary tool G in a rotating state is inserted into the starting position SH1 set in the second tab member 3, and moved so as to make a circuit along the butting portion J4 down to the complete position EH1. As shown in FIG. 7B, in the refill member joining process, the provisional joining rotary tool G is moved with the shoulder portion G1 being pushed into the front surface 12 of the metal member 1. Moreover, the stirring pin G2 of the provisional joining rotary tool G is designed longer than the thickness of the refill member 4.

Figure 8:
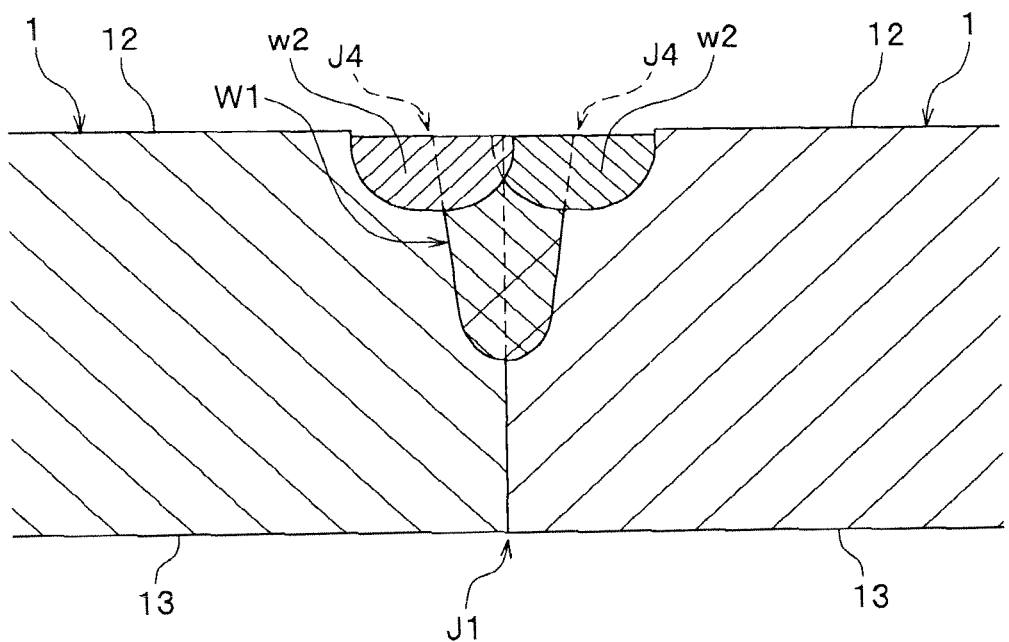
FIG. 8 is a sectional view showing the first embodiment after the first repairing process.

As shown in FIG. 8, after the provisional joining rotary tool G is moved around to form two lines of plasticized regions w2 with respect to the refill member 4, all area of the refill member 4 is covered by the plasticized regions w2, w2. Since the plasticized region W1 and the plasticized region w2 overlap each other, the air-tightness and water-tightness can be further enhanced.

After the first primary joining process, if a stepped portion between the front surface 12 of the metal members 1 and the front surface of the plasticized region W1 is large, the depressed groove forming process can be omitted. Meanwhile, in the refill member joining process, the metal members 1 and the refill member 4 may be joined together by normal welding.

(5) Second Preliminary Process

When the first primary joining process is finished, the metal members 1, 1 are turned over, and the second preliminary process is carried out. In the present embodiment, the second preliminary process includes a pilot hole forming process for forming a pilot hole (not shown) at the starting position of the friction stirring in the second primary joining process. It should be noted that, in the second preliminary process, the provisional joining may be carried out on the butting portion J1 from the back surface 13 of the metal members 1, 1.

(6) Second Primary Joining Process

Figure 9A:
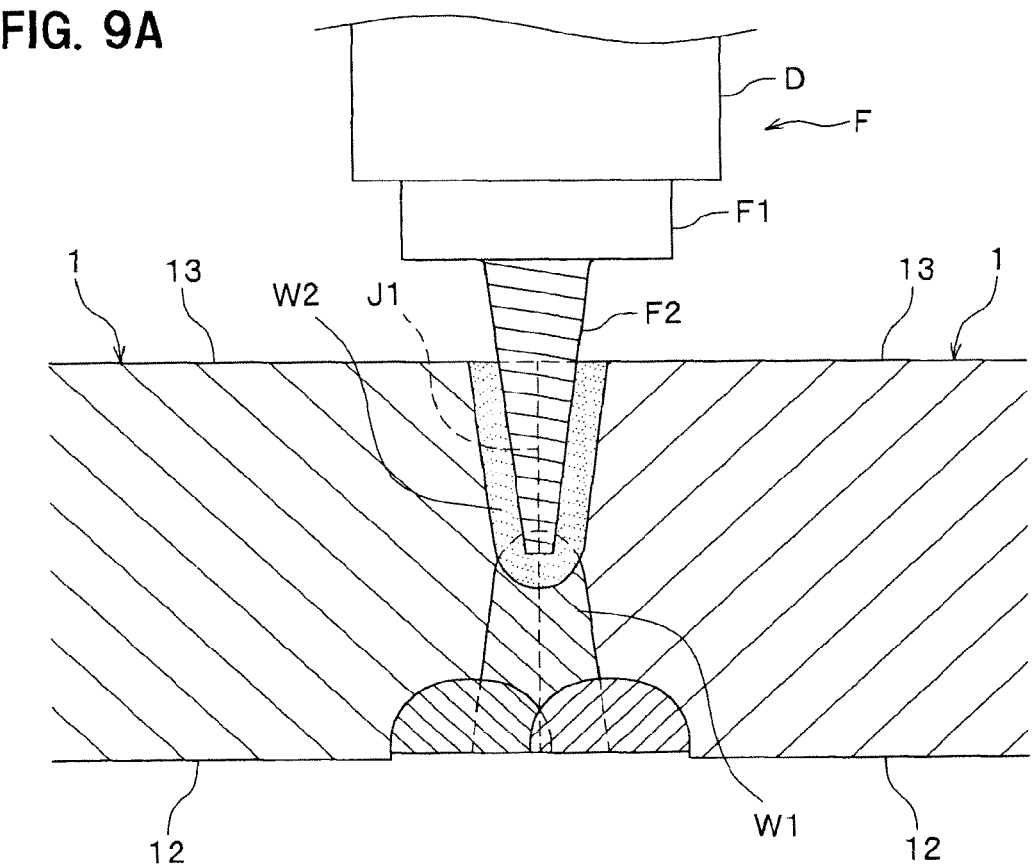
FIG. 9A is a sectional view showing the second primary joining process of the first embodiment.

When the second preliminary process is completed, the second primary joining process is carried out as shown in FIG. 9A, in which the friction stir welding is carried out on the butting portion J1 from the back surface 13 of the metal members 1 by means of the primary joining rotary tool F. In the second primary joining process, a substantially same operation as the first primary joining process is carried out from the back surface 13. In the second primary joining process, only the stirring pin F2 is inserted into the metal members 1, with the connection portion F1 of the primary joining rotary tool F being kept away from the metal members 1. When the friction stir welding is carried out on the butting portion J1, the stirring pin F2 of the primary joining rotary tool F is put into the plasticized region W1 formed by the first primary joining process to carry out the friction stirring.

(7) Second Repairing Process

Figure 9B:
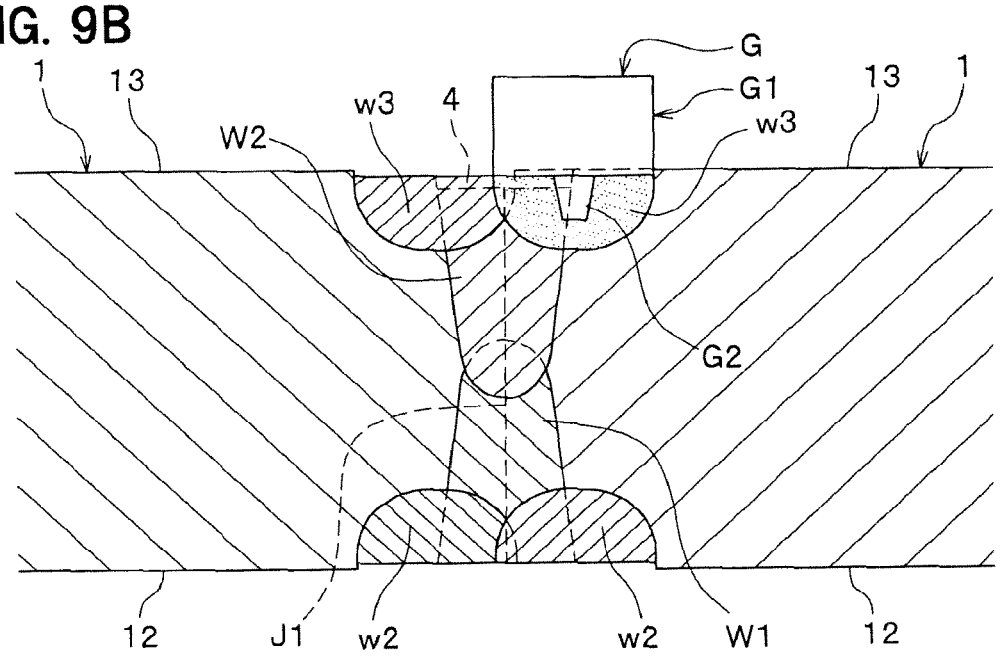
FIG. 9B is a sectional view showing the second repairing process of the present embodiment.

When the second primary joining process is completed, the second repairing process is initiated on the plasticized region W2 formed in the metal members 1 by the second primary joining process. In the second repairing process, a substantially same operation as the first repairing process is carried out from the back surface 13. As shown in FIG. 9B, after the second repairing process is carried out, all area of the refill member 4 is all covered by two lines of plasticized regions w3. Lastly, the first tab member 2 and the second tab member 3 are cut off from the metal members 1, 1.

According to the friction stir welding described above, when the friction stir welding is carried out, only the stirring pin F2 of the primary joining rotary tool F is brought into contact with the metal members 1, 1, and thus the friction between the metal members 1, 1 and the primary joining rotary tool F can be reduced as compared to prior arts, and the load on the friction stirring apparatus can be reduced. Since the load on the friction stirring apparatus is reduced, the stirring pin F2 can be inserted into a deep location of the metal members 1, 1.

Moreover, by having the plasticized region W1 formed by the first primary joining process in contact with the plasticized region W2 formed by the second primary joining process, the friction stir welding can be carried out over the entire length in a thickness direction of the butting portion J1, and thus the air-tightness and water-tightness can be enhanced. Moreover, in the present embodiment, when the second primary joining process is carried out, the friction stir welding is carried out in such a manner that the stirring pin F2 is brought into contact with the plasticized region W1. Thus, even if the joining defects are present in the plasticized region W1, such joining defects can be repaired.

Moreover, even if a stepped portion is formed on the front surface 12 or the back surface 13 of the metal members 1 in the first primary joining process or the second primary joining process, the front surface 12 or the back surface 13 of the metal members 1 can be formed flat by carrying out the repairing process. Moreover, in the refill member joining process, although at least the metal members 1 and the refill member 4 are joined together, the air-tightness and water-tightness can be further enhanced by carrying out the friction stir welding on the entire refill member 4 and covering the refill member 4 with the plasticized regions w2, w3 as in the present embodiment.

Moreover, by carrying out the provisional joining process of the butting portion J1, the metal members 1, 1 can be prevented from separating away from each other when carrying out the primary joining process. Moreover, the operation for inserting and pulling out the rotary tool can be facilitated by providing the tab members, and the friction force against insertion of the rotary tool can be reduced by providing a pilot hole in these tab members.

In the above, the first embodiment of the present invention is explained, but its design can be changed within the scope not contradicting the spirit of the present invention. For example, FIG. 10A and FIG. 10B are the figures showing an exemplary variant of the repairing process; FIG. 10A shows a depressed groove forming process, and FIG. 10B shows a buildup welding process. In the repairing process, a repair can be conducted by buildup welding instead of the refill member 4. That is, as shown in FIG. 10A, after the depressed groove M is formed on the plasticized region W1 formed by the first primary joining process, the buildup welding may be carried out on the depressed groove M. Thus, the weld metal N is filled in the depressed groove M, and the front surface 12 of the metal members 1, 1 can be formed flat. It should be noted that the depressed groove forming process may be omitted.

Moreover, although the provisional joining process is carried out by the friction stir welding in the first embodiment, it may be carried out by normal welding. Moreover, in the repairing process carried out by means of the refill member 4, the provisional joining rotary tool G is used, but a larger rotary tool may be used if the refill member 4 is thicker. Moreover, the refill member 4 and the metal members 1 may be joined by normal welding.

[Second Embodiment]

The second embodiment of the present invention will be described in detail. The second embodiment includes (1) a preparation process, (2) a preliminary process, (3) a primary joining process, and (4) a repairing process.

(1) Preparation Process

The preparation process will be described with reference to FIG. 11. In the second embodiment, the preparation process includes: a butting process for butting metal members 201, 202 to be joined against each other; a tab member disposing process for disposing a tab member 203 at a periphery of the butting portion J1 of the metal members 201, 202; and a welding process for provisionally joining the tab member 203 to the metal member 201, 202 by welding.

Figure 11A:
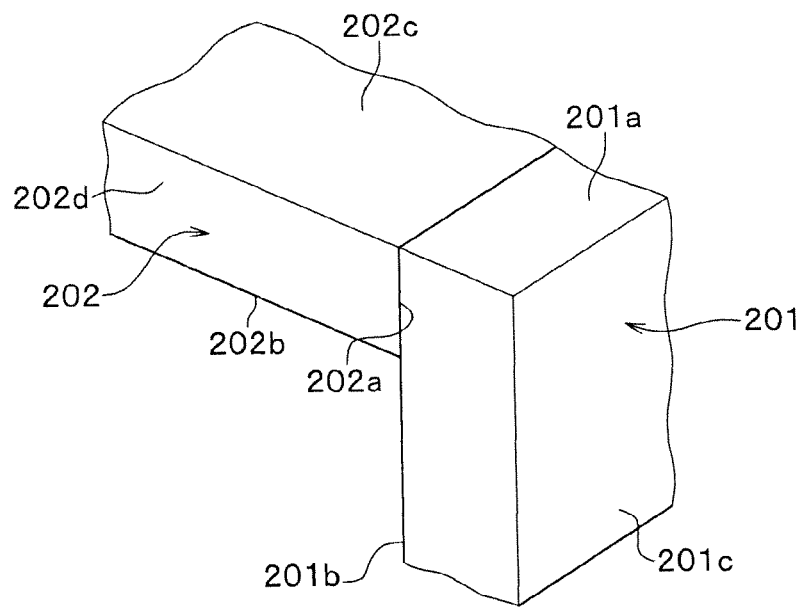
FIG. 11A is a perspective view showing the preparation process of the second embodiment.

In the butting process, as shown in FIG. 11A, the side surface 201b of the metal member 201 is butted against the end surface 202a of the metal member 202 in order to be joined together. The end surface 201a of the metal member 201 and the side surface 202c of the metal member 202 are arranged to be flush with each other. That is, in the butting process, the metal members 201, 202 are butted against each other orthogonally so as to form a L-shape in a side view. The metal members 201, 202 may be made of a metal capable of friction stirring, and in the present embodiment an aluminum alloy is used.

Figure 11B:
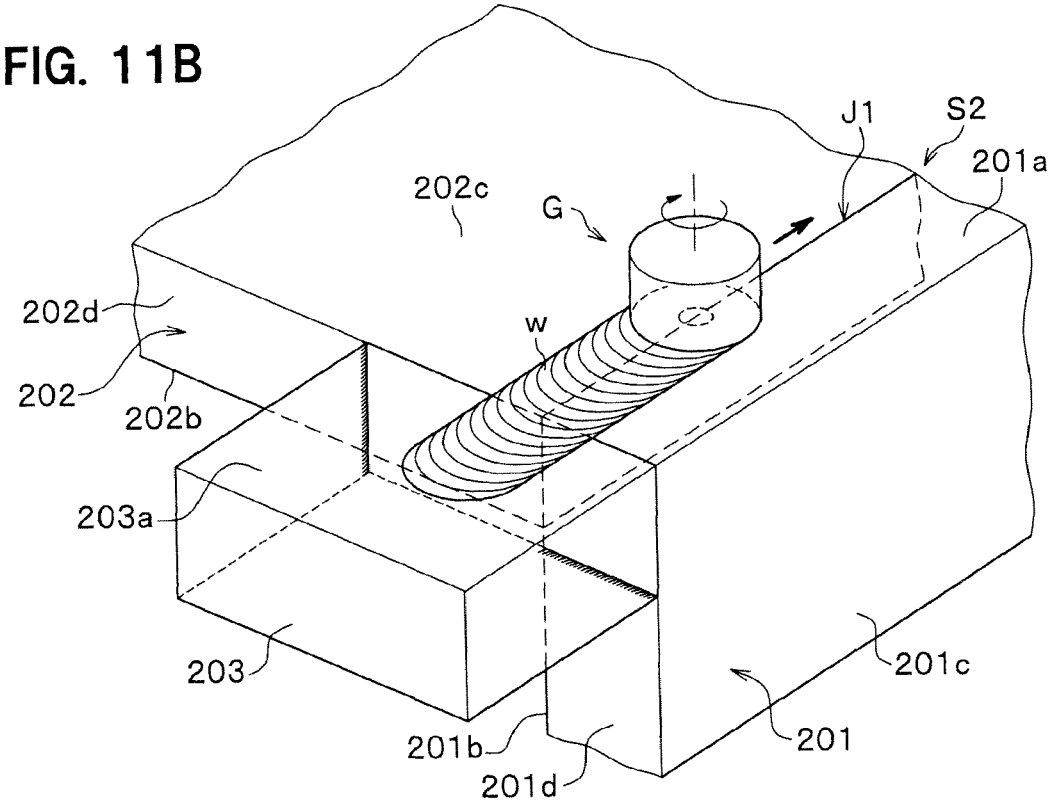
FIG. 11B is a perspective view showing the preliminary process of the second embodiment.

In the tab member disposing process, as shown in FIG. 11B, a tab member 203 is located on one peripheral side of the butting portion J1 of the metal members 201, 202 so as to come into contact with the side surface 201d of the metal member 201 and with the side surface 202d of the metal member 202. The front surface 203a of the tab member 203, the side surface 202c of the metal member 202 and the end surface 201a of the metal member 201 are arranged flush with one another.

In the welding process, the metal members 201, 202 and the tab member 203 are welded to be joined together.

After the preparation process, the metal members 201, 202 and tab member 203 are placed on the platform of the friction stirring apparatus (not shown), and are fixed to be unmovable using a jig such as a clamp (not shown).

(2) Preliminary Process

The preliminary process includes a provisional joining process for provisionally joining the butting portion J1 of the metal members 201, 202. Specifically, as shown in FIG. 11B, the provisional joining rotary tool G is inserted into the tab member 203, and the friction stir welding is carried out on the butting portion J1 from the outer side (a side of the surfaces forming the outer corner) of the metal members 201, 202. In the provisional joining process, as shown in FIG. 2B, the provisional joining rotary tool G is moved with the lower surface of the shoulder portion G1 pushed into the metal members 201, 202. After joining the entirety or a part of the butting portion J1, the tab member 203 is cut off from the metal members 201, 202. In the present embodiment, although the provisional joining process is carried out by the friction stir welding, the provisional joining of the metal members 201, 202 may be carried out by normal welding for example.

(3) Primary Joining Process

Figure 12A:
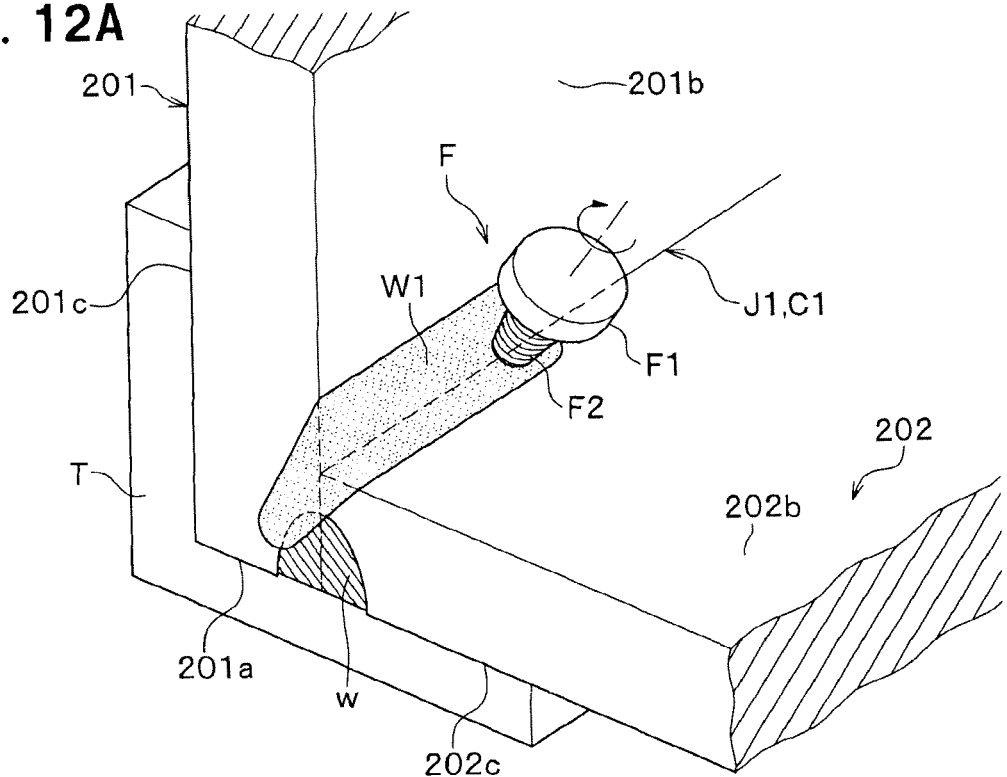
FIG. 12A is a perspective view showing the primary joining process of the second embodiment.

After the preliminary process is completed, the primary joining process is carried out for firmly joining the metal members 201, 202 together at the butting portion J1 therebetween. In the primary joining process according to the present embodiment, as shown in FIG. 12A, a back support member T is first located on the surfaces forming the outer corner of the metal members 201, 202. The back support member T is a metal member formed in a L-shape in a plan view, and is brought into contact with the side surface 201c and the end surface 201a of the metal member 201 and with the side surface 202c of the metal member 202. Then, the metal members 201, 202 and the back support member T are placed on the platform of the friction stirring apparatus (not shown), and are fixed to be unmovable using a jig such as a clamp (not shown).

Next, in the primary joining process, the primary joining rotary tool F in a rotating state is inserted into the inner corner of the metal member 201 and the metal member 202 (the corner formed by the side surface 201b and the side surface 202b), and the friction stir welding is carried out on the butting portion J1. In the primary joining process, as shown in FIG. 12A and FIG. 12B, the connection portion F1 of the primary joining rotary tool F is kept away from the metal members 201, 202, and only the stirring pin F2 is inserted into the butting portion J1.

Figure 12B:
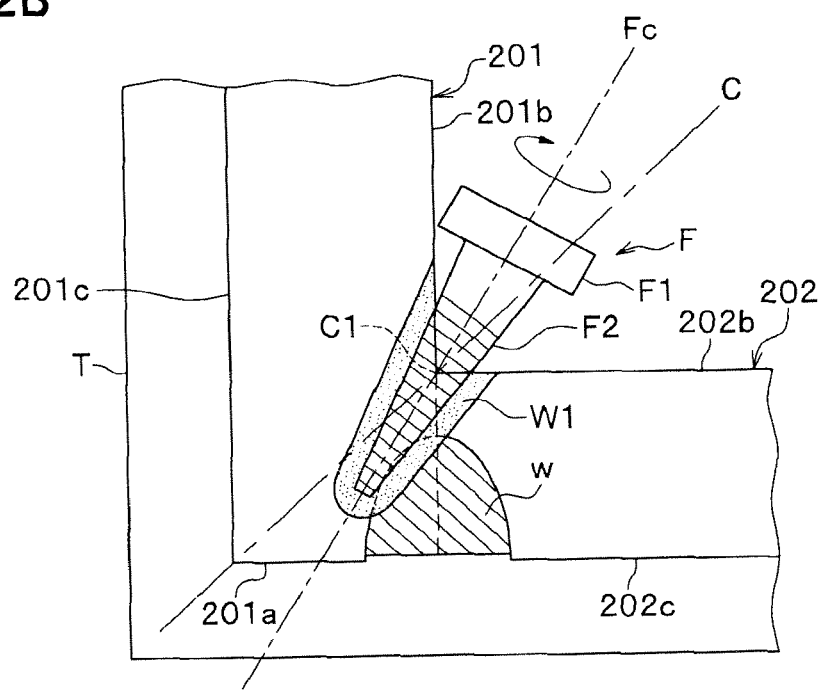
FIG. 12B is a sectional view showing the primary joining process of the second embodiment.

Moreover, in the primary joining process, as shown in FIG. 12B, the friction stir welding is carried out with the rotation center axis Fc of the primary joining rotary tool F being inclined. That is, in the primary joining process, the rotation center axis Fc of the primary joining rotary tool F is inserted into the intersection line C1 of the side surface 201b and the side surface 202b, and positioned between the side surface 201b of the metal member 201 and the imaginary reference plane C which extends through the intersection line C1 and forms an angle $\alpha/2$ (in the present embodiment, $\alpha=90°$) with respect to both of the side surface 201b and the side surface 202b. In the primary joining process, the plasticized region W1 formed in the primary joining process is overlapped with the plasticized region w formed in the provisional joining process. It should be noted that the position of the rotation center axis Fc includes neither the position of the side surface 201b nor the position of the imaginary reference plane C, so as not to overlap the side surface 201b or the imaginary reference plane C.

(4) Repairing Process

Figure 13:
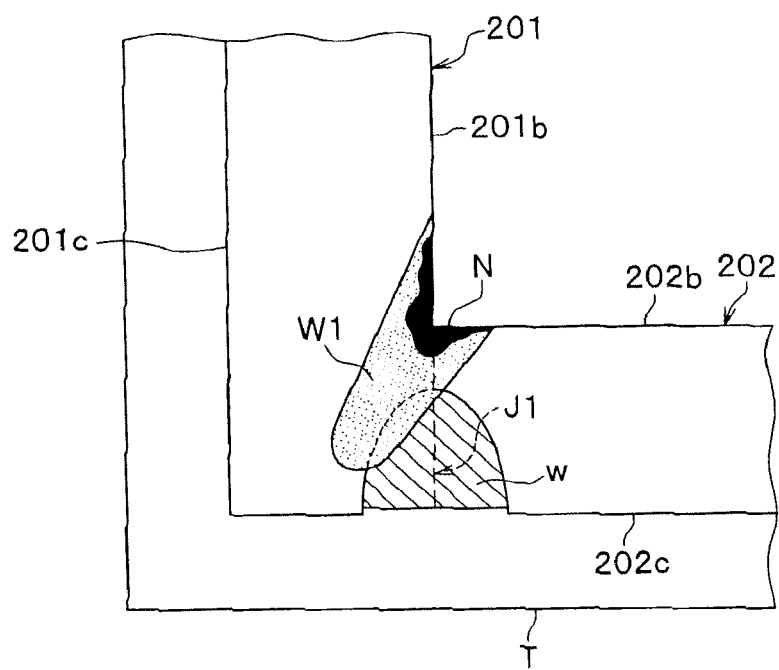
FIG. 13 is a sectional view showing the repairing process of the second embodiment.

After the primary joining process is completed, the repairing process is carried out on the plasticized region W1 formed in the metal members 201, 202 by the primary joining process. In the repairing process of the present embodiment, as shown in FIG. 13, the buildup welding is carried out on the upper surface of the plasticized region W1.

In the primary joining process, although a groove tends to be formed due to lack of metal on the upper surface (front surface) of the plasticized region W1, such insufficient metal can be replenished by carrying out the buildup welding. As shown in FIG. 13, it is preferred that the weld metal N formed by the buildup welding is formed so as to be flush with the side surface 201b of the metal member 201 and the side surface 202b of the metal member 202. It should be noted that, the buildup welding may be carried out on the depressed groove, which has been formed in advance by carrying out slot milling on the upper surface of the plasticized region W1 before carrying out the buildup welding. Moreover, if the groove is relatively shallow, the groove formed by the friction stir welding may be removed by carrying out plain milling on the side surface 201b of the metal member 201 and the side surface 202b of the metal member 202, instead of the buildup welding.

According to the friction stir welding of the present embodiment described above, since only the stirring pin F2 is inserted in the metal members 201, 202 in the primary joining process in order to join the metal members 201, 202 together at the inner corner thereof, the damage to the side surface 201b of the metal member 201 and to the side surface 202b of the metal member 202 during joining can be reduced. Moreover, since the conventional holding block is not used, the joining portion can be observed visually. Thus, an operator can grasp the situation of joining etc to facilitate the operation.

Moreover, in the primary joining process, the air-tightness and water-tightness can be enhanced by making the plasticized region W1 formed in the primary joining process to overlap the plasticized region w formed in the provisional joining process. Moreover, by carrying out the provisional joining process by means of the provisional joining rotary tool G which is smaller than the primary joining rotary tool F, the metal members 201, 202 can be prevented from separating away from each other.

Moreover, in the primary joining process, by inclining the primary joining rotary tool F toward the metal member 201, the stirring pin F2 can be inserted down to a deep location of the butting portion J1 as compared to when the stirring pin F2 is inserted along the imaginary reference plane C shown in FIG. 12B for example, i.e., when the angles formed between the rotation center axis Fc and the side surfaces 201b, 202b are 45° with respect to the orthogonally arranged metal members 201, 202. Thus, the joining can be carried out down to a deep location of the butting portion J1.

Moreover, an insufficient amount of metal caused in the primary joining process can be replenished by carrying out buildup welding on the plasticized region W2 formed in the primary joining process.

<Third Embodiment>

Next, the friction stir welding method according to the third embodiment of the present invention will be explained. The third embodiment includes (1) a preparation process, (2) a preliminary process, (3) a first primary joining process, (4) a second primary joining process, and (5) a repairing process. The third embodiment shows an example in which the metal members 1, 2 joined together are thicker than those in the second embodiment. The third embodiment is different from the second embodiment in that the primary joining process is carried out twice. Since (1) the preparation process and (2) the preliminary process are same as those in the second embodiment, they are not explained in detail.

(3) First Primary Joining Process

Figure 14A:
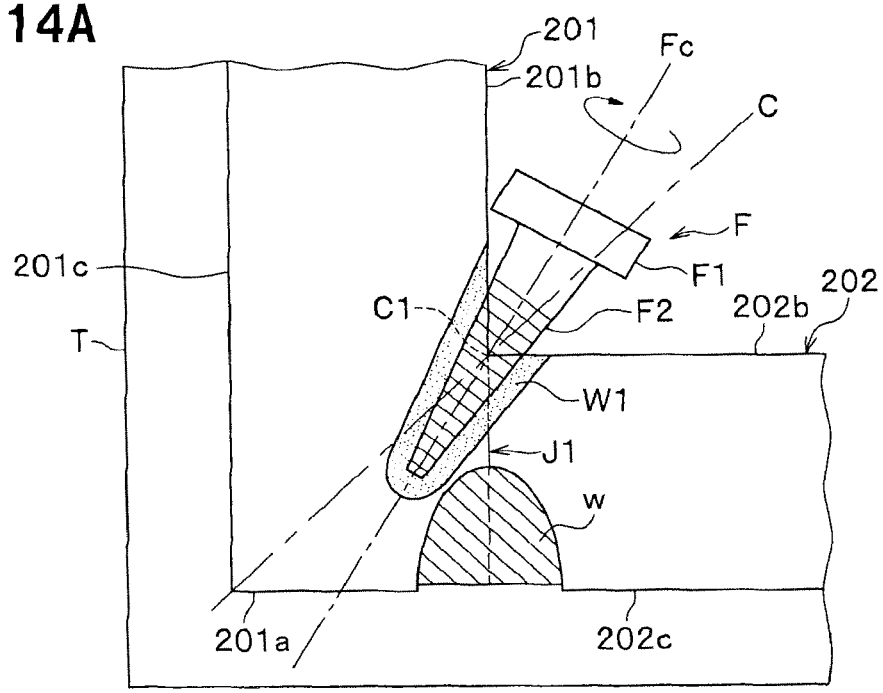
FIG. 14A is a sectional view showing the first primary joining process of the third embodiment.

In the first primary joining process, as shown in FIG. 14A, the primary joining rotary tool F in a rotating state is inserted into the butting portion J1 at the inner corner of the metal members 201, 202 in order to carry out the friction stir welding, in a substantially same manner as the primary joining process of the aforementioned second embodiment. In the third embodiment, since the thicknesses of the metal members 201, 202 are large, even if the insertion angle of the primary joining rotary tool F is inclined toward the metal member 201, the plasticized region W1 formed in the primary joining process does not overlap the plasticized region w formed in the provisional joining process.

(4) Second Primary Joining Process

Figure 14B:
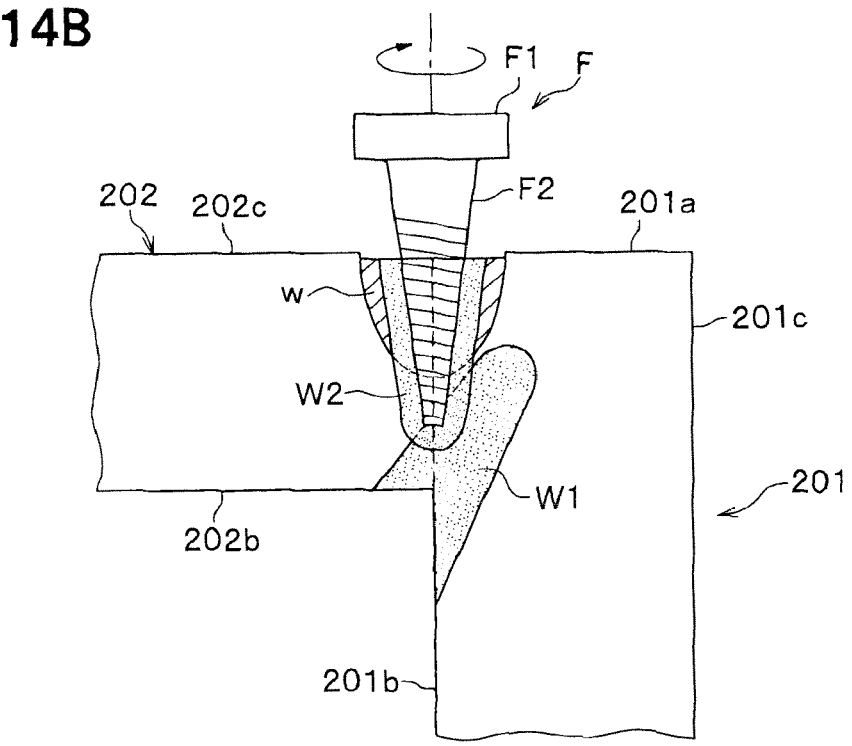
FIG. 14B is a sectional view showing the second primary joining process of the third embodiment.

In the second primary joining process, the friction stir welding is carried out by means of the primary joining rotary tool F from the surfaces forming the outer corner of the metal members 201, 202. Specifically, as shown in FIG. 14B, the rotating stirring pin F2 of the primary joining rotary tool F is inserted from the end surface 201a of the metal member 201 and from the side surface 202c of the metal member 202, and is moved along the butting portion J1. In the second primary joining process, the connection portion F1 of the primary joining rotary tool F is kept away from the metal members 201, 202, and only the stirring pin F2 is inserted into the butting portion J1. The plasticized region W2 formed in the second primary joining process is overlapped with the plasticized region W1 formed in the first primary joining process. In the second primary joining process of the present embodiment, the stirring pin F2 is maneuvered so as to reach the plasticized region W1. Thus, the butting portion J1 can be joined more securely.

It should be noted that, in the second primary joining process, the friction stir welding may be carried out on the metal members 201, 202 with tab members provided as appropriate. The tab members used in the provisional joining process may be used in the second primary joining process, without cutting and removing it.

(5) Repairing Process

In the repairing process, the buildup welding is carried out on the upper surfaces of the plasticized region W1 formed in the first primary joining process and of the plasticized region W2 formed in the second primary joining process in order to replenish insufficient metal, in the same manner as the repairing process of the second embodiment.

According to the third embodiment described above, a substantially same effect as in the second embodiment is obtained, and the air-tightness and water-tightness can be enhanced by carrying out the second primary joining process, because the friction stir welding is carried out over the entire extension of the butting portion J1, even though the metal members 1, 2 are thick. Moreover, according to the primary joining rotary tool F, the load exerted on the friction stirring apparatus is reduced so that the stirring pin F2 can be inserted into a deep location.

It should be noted that the second primary joining process is carried out by means of the primary joining rotary tool F in the present embodiment, but it is not the only option. For example, a rotary tool having a shoulder portion and a long stirring pin may be used.

In the above, the embodiments of the present invention are described, but the design can be changed as appropriate within the scope not contradicting the spirit of the present invention. For example, in the present embodiment the metal members 201, 202 are butted against each other orthogonally, but they can be butted at any angle, as far as the angle is not 180° between the side surface 201b of the metal member 201 and the side surface 202b of the metal member 202. Moreover, the metal members 201, 202 may be cut in an oblique shape at the end surfaces 201a, 202a thereof, and then butted against each other, for example.

WORKING EXAMPLES

In working examples 1-3, the plasticized regions were formed by moving three primary joining rotary tools FA, FB, FC different in size from one another, a predetermined length over the front surface 12 of the flat metal member 1 made of aluminum alloy, under different conditions of rotating speed settings for the respective rotary tools and of the pilot holes. Then, the cut surfaces of the plasticized regions were observed. With regard to the reference signs and dimensions in the working examples, FIG. 1 should be referred to where necessary. The friction stir welding was carried out by rotating clockwise the primary joining rotary tool and inserting only the stirring pin F2 into the metal member 1, with the connection portion F1 kept away from the metal member 1.

Working Example 1

FIG. 15 shows the conditions of working example 1 and the cross-sectional views of respective plasticized regions. In working example 1, testings were carried out in respective conditions for the specimens Nos. 1-3 by means of the primary joining rotary tool FA. The outer diameter X1 and thickness X2 of the connection portion F1 of the primary joining rotary tool FA were 140 mm and 40 mm, respectively (refer to FIG. 1A). The length Y1, the base end outer diameter Y2 and the leading end outer diameter Y3 of the stirring pin F2 were 55 mm, 32 mm and 16 mm, respectively. A spiral groove F3 of the left-handed screw was formed on the outer circumferential surface of the stirring pin F2, by being engraved thereon at 2 mm depth and 2 mm pitch.

Figure 16:
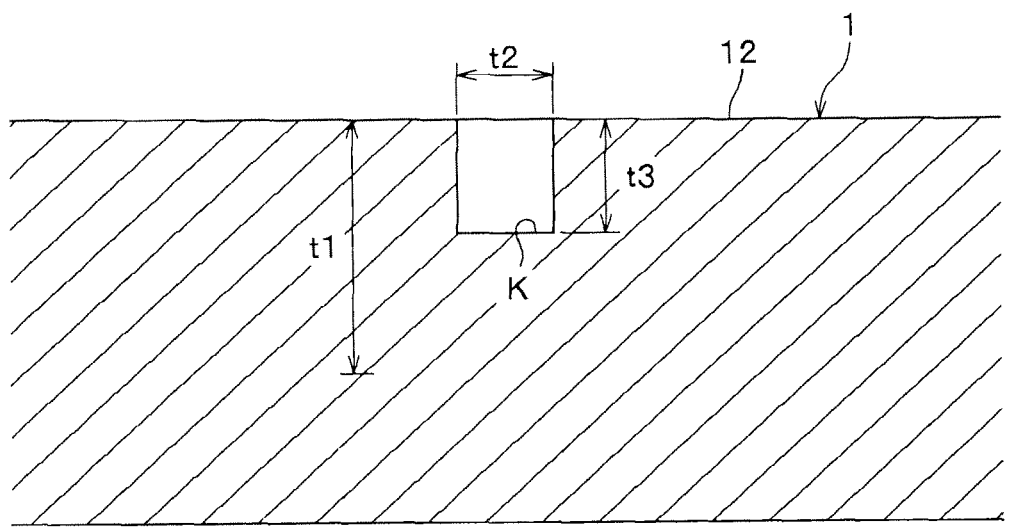
FIG. 16 is a sectional view for explanation of working example 1.

FIG. 16 is a sectional view for explaining working example 1. The dimension t1 of an insertion depth is the length from the leading end of the inserted stirring pin F2 to the front surface 12. The pilot hole K had a cylindrical shape, and was set to a diameter t2=20 mm and a depth t3=45 mm.

As shown in FIG. 15, joining defects were not observed in any of the specimens Nos. 1-3 of working example 1. A stepped portion P was formed on the front surface 12 of the metal member 1. The stepped portion P became deeper as it went leftward viewing in the traveling direction of the primary joining rotary tool FA. The stepped portion P is considered to be formed by the metal that was plasticized and fluidized by the friction stir welding and scattered or flowed outward so as to form burrs L. The burrs L were concentrated around the left side viewing in the traveling direction of the primary joining rotary tool FA. When the primary joining rotary tool FA was used, the difference in the rotating speed of the tool did not have a large influence.

Working Example 2

FIG. 17 shows the conditions of working example 2 and the cross-sectional views of respective plasticized regions. In working example 2, testings were carried out in respective conditions of the specimens Nos. 4-7 by means of the primary joining rotary tool FB. The outer diameter X1 and the thickness X2 of the connection portion F1 of the primary joining rotary tool FB were 140 mm and 55 mm, respectively (refer to FIG. 1A). The length Y1, the base end outer diameter Y2 and the leading end outer diameter Y3 of the stirring pin F2 were 77 mm, 38 mm and 16 mm. A spiral groove F3 of the left-handed screw was formed on the outer circumferential surface of the stirring pin F2, by being engraved thereon at 2 mm depth and 2 mm pitch.

Figure 18:
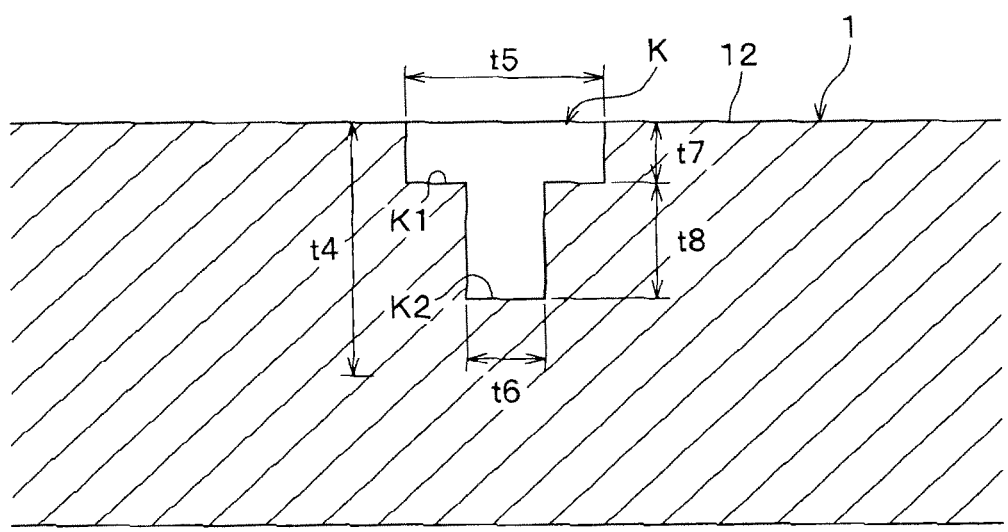
FIG. 18 is a sectional view for explanation of working examples 2 and 3.

FIG. 18 is a sectional view for explaining working example 2.

The dimension t4 of an insertion depth was the length from the leading end of the inserted stirring pin F2 to the front surface 12. The pilot hole K was made up of a wide portion K1 and a narrow portion K2 formed beneath the bottom surface of the wide portion K1. Both of the wide portion K1 and the narrow portion K2 had a cylindrical shape. The diameter and the depth of the wide portion K1 were t5 and t7, respectively, and the diameter and the depth of the narrow portion K2 were t6 and t8, respectively.

As shown in FIG. 17, joining defects were not observed in any of the specimens Nos. 4-7 of working example 2. A stepped portion P was formed on the front surface 12 of the metal member 1. The stepped portion P is considered to be formed by the metal that is plasticized and fluidized by the friction stir welding and scattered or flowed outward so as to form burrs L. Regarding Nos. 4 and 5, the metal pattern of the upper portion was different from the metal pattern of the lower portion in the plasticized region W. This is probably because the metal of the upper area in the plasticized and fluidized metal is prone to be heated to a high temperature due to a high rotating speed of the tools in Nos. 4 and 5. On the other hand, since the rotating speed of the tool is low in Nos. 6 and 7, the patterns of the plasticized region W thereof were substantially uniform. Regarding the specimen No. 7, the stepped portion P was relatively small.

Working Example 3

FIG. 19 shows the conditions of working example 3 and the cross-sectional views of respective plasticized regions. In working example 3, testings were carried out in respective conditions of the specimens Nos. 8-11 by means of the primary joining rotary tool FC. The outer diameter X1 and the thickness X2 of the connection portion F1 of the primary joining rotary tool FC were 140 mm and 45 mm, respectively (refer to FIG. 1A). The length Y1, the base end outer diameter Y2 and the leading end outer diameter Y3 of the stirring pin F2 were 157 mm, 54.7 mm and 16 mm, respectively. A spiral groove F3 of the left-handed screw was formed on the outer circumferential surface of the stirring pin F2, by being engraved thereon at 2 mm depth and 2 mm pitch.

As shown in FIG. 19, joining defects were observed in the area of reference sign Q (left side viewing in the traveling direction of the rotary tool) of the specimens Nos. 8-10 of working example 3. A relatively large stepped portion P was formed at the front surface 12 of the metal member 1. The stepped portion P is considered to be formed by the metal that is plasticized and fluidized by the friction stir welding and scattered or flowed outward so as to form burrs L. On the other hand, because the insertion depth was set to a short length in the specimen No. 11 (about half the length of the stirring pin F2 was inserted), no stepped portion was made substantially.

Working Examples 4-6

Figure 20:
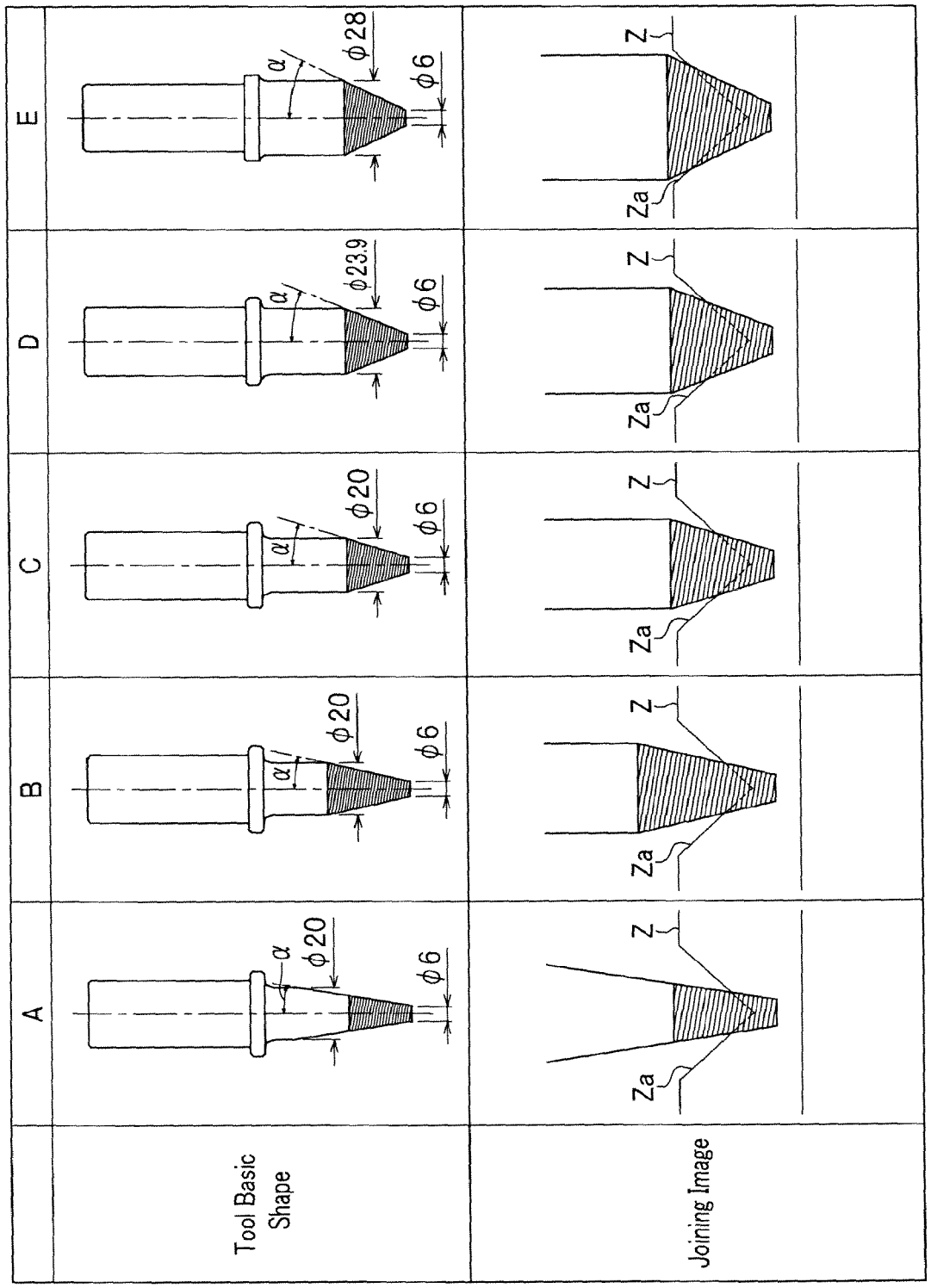
FIG. 20 is a side view showing basic shapes of the primary joining rotary tools which are used in working examples 4-6.

In working examples 4-6, as shown in FIG. 20, totally 20 pieces of primary joining rotary tools, with 5 types of pin angle (angle between the rotation axis and the outer circumferential surface of the stirring pin) and 4 types of screw thread depth and screw pitch, were prepared, and respective joined states were studied.

As shown in FIG. 20, the metal member Z to be joined was made of aluminum alloy, and formed with a V-shaped groove Za having a V-shaped cross-section. The angle of a V-shaped groove Za was 90°. In each working example, only the stirring pin of each primary joining rotary tool was inserted into the V-shaped groove Za at a predetermined depth, and was moved along a predetermined distance in the longitudinal direction of the V-shaped groove Za. The insertion depths of the stirring pins in each working example were set to a common depth.

Figure 21:
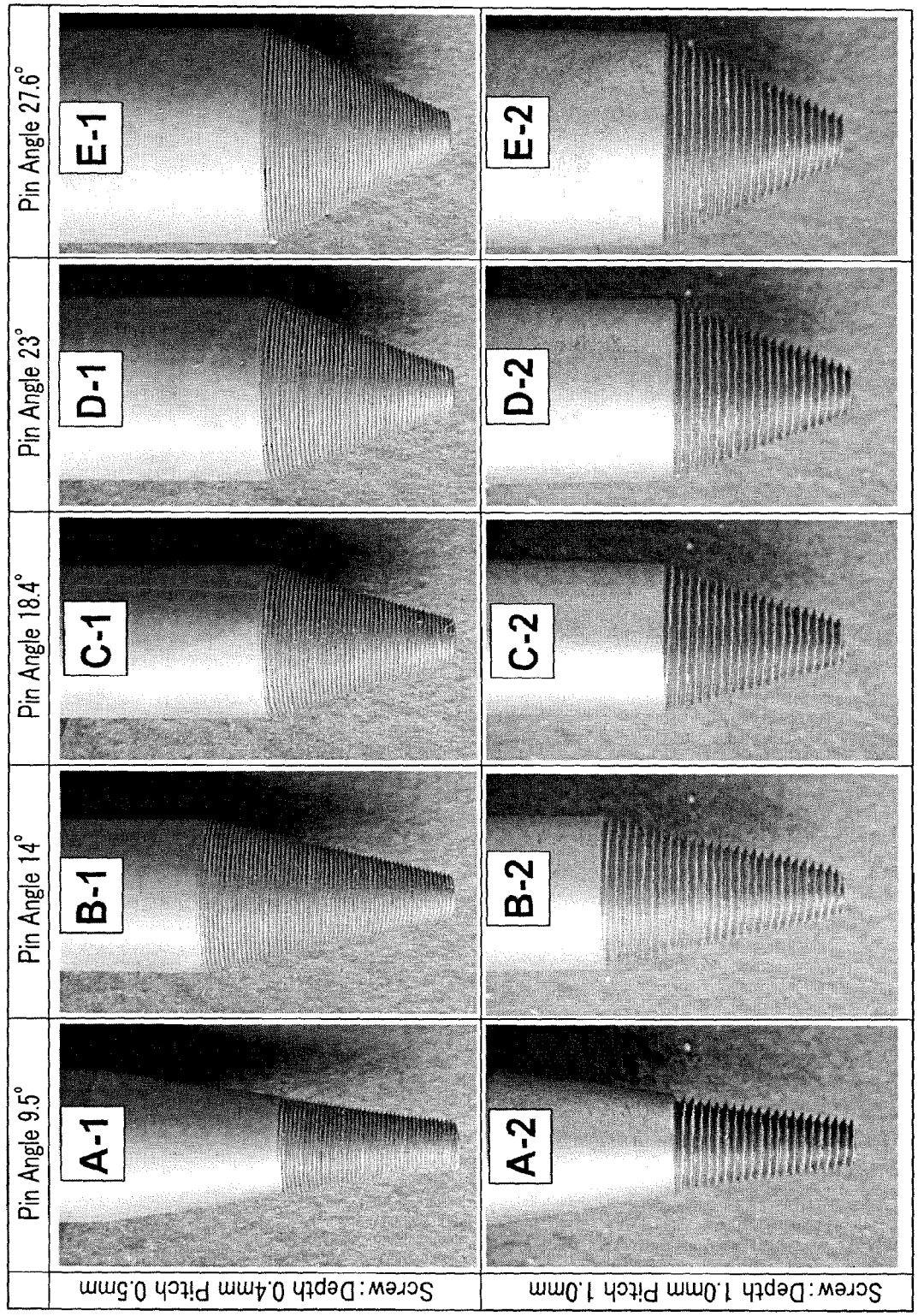
FIG. 21 is side views showing the first and second series of the primary joining rotary tool which are used in working examples 4-6.
Figure 22:
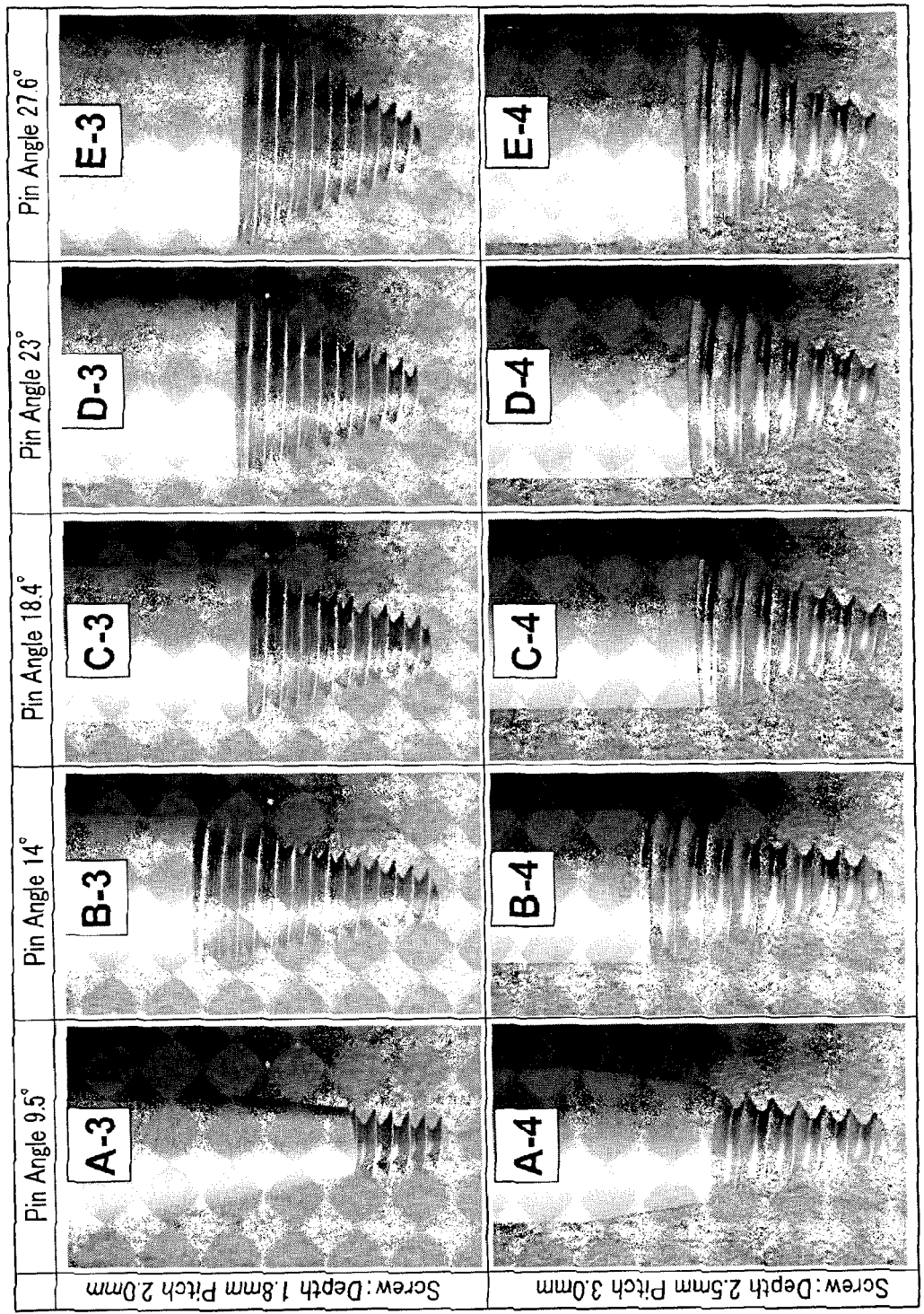
FIG. 22 is side views showing the third and fourth series of the primary joining rotary tool which are used in working examples 4-6.

As shown in the vertical direction of FIG. 21 and FIG. 22, A-series of primary joining rotary tools had a pin angle of 9.5 degree; B-series of primary joining rotary tools had a pin angle of 14 degree; C-series of primary joining rotary tools had a pin angle of 18.4 degree; D-series of primary joining rotary tools had a pin angle of 23 degree; and E-series of primary joining rotary tools had a pin angle of 27.6 degree.

Moreover, as shown in the lateral direction of FIG. 21 and FIG. 22, 1-series had a screw thread depth of 0.4 mm and a screw pitch of 0.5 mm; 2-series had a screw thread depth of 1.0 mm and a screw pitch of 1.0 mm; 3-series had a screw thread depth of 1.8 mm and a screw pitch of 2.0 mm; and 4-series had a screw thread depth of 2.5 mm and a screw pitch of 3.0 mm. For example, as shown in FIG. 21, the primary joining rotary tool C-2 had a pin angle of 18.4 degree, a screw thread depth of 1.0 mm, and a screw pitch of 1.0 mm.

Figure 23A:
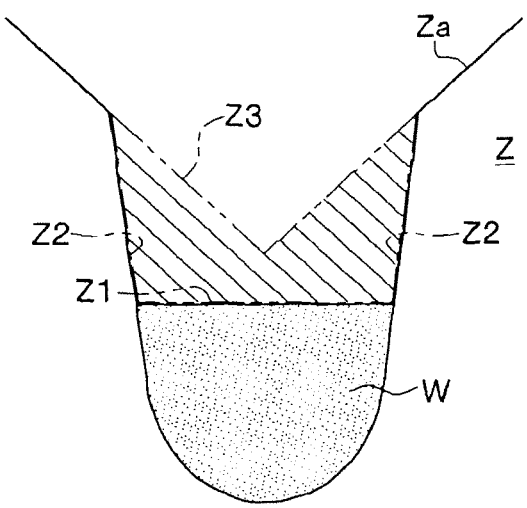
FIG. 23A is a schematic diagram showing the material reduction amount of the fillet portion of the working example.

Moreover, the term "material reduction amount of the fillet portion ($mm^2$)" mentioned below means, as shown in FIG. 23A, the sectional area of the region surrounded by: the upper surface Z1 of the plasticized region W formed after the friction stir welding; the side walls Z2, Z2 of the metal member Z; and the imaginary extension line Z3 of the V-shaped groove Za. It should be noted that, if joining defects are present in the inside of the plasticized region W, the sectional areas of the regions of this joining defects are also added as "material reduction amount of the fillet portion ($mm^2$)."

Figure 23B:
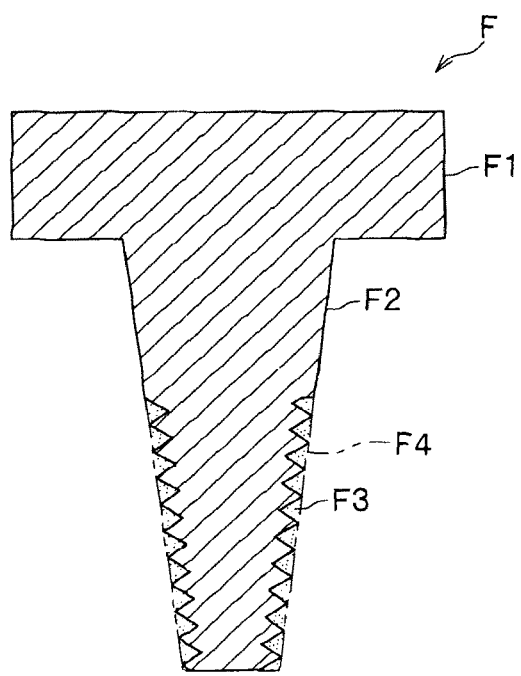
FIG. 23B is a schematic diagram showing the sectional area of the screw of the working example.

Moreover, the term "screw sectional area ($mm^2$)" mentioned below means, as shown in FIG. 23B, the summation of sectional areas of regions surrounded by the spiral groove F3 and the imaginary line F4 extending along the outer circumferential surface of the stirring pin F2 (portions depicted with dots).

Working Example 4

In working example 4, the friction stir welding was carried out by using totally 20 types of primary joining rotary tools consisting of the aforementioned primary joining rotary tools A-1 to A-4, the primary joining rotary tools B-1 to B-4, the primary joining rotary tools C-1 to C-4, the primary joining rotary tools D-1 to D-4, and the primary joining rotary tools E-1 to E-4, and by setting the rotating speed to 1000 rpm and the joining speed (moving speed) to 100 mm/min.

Figure 24:
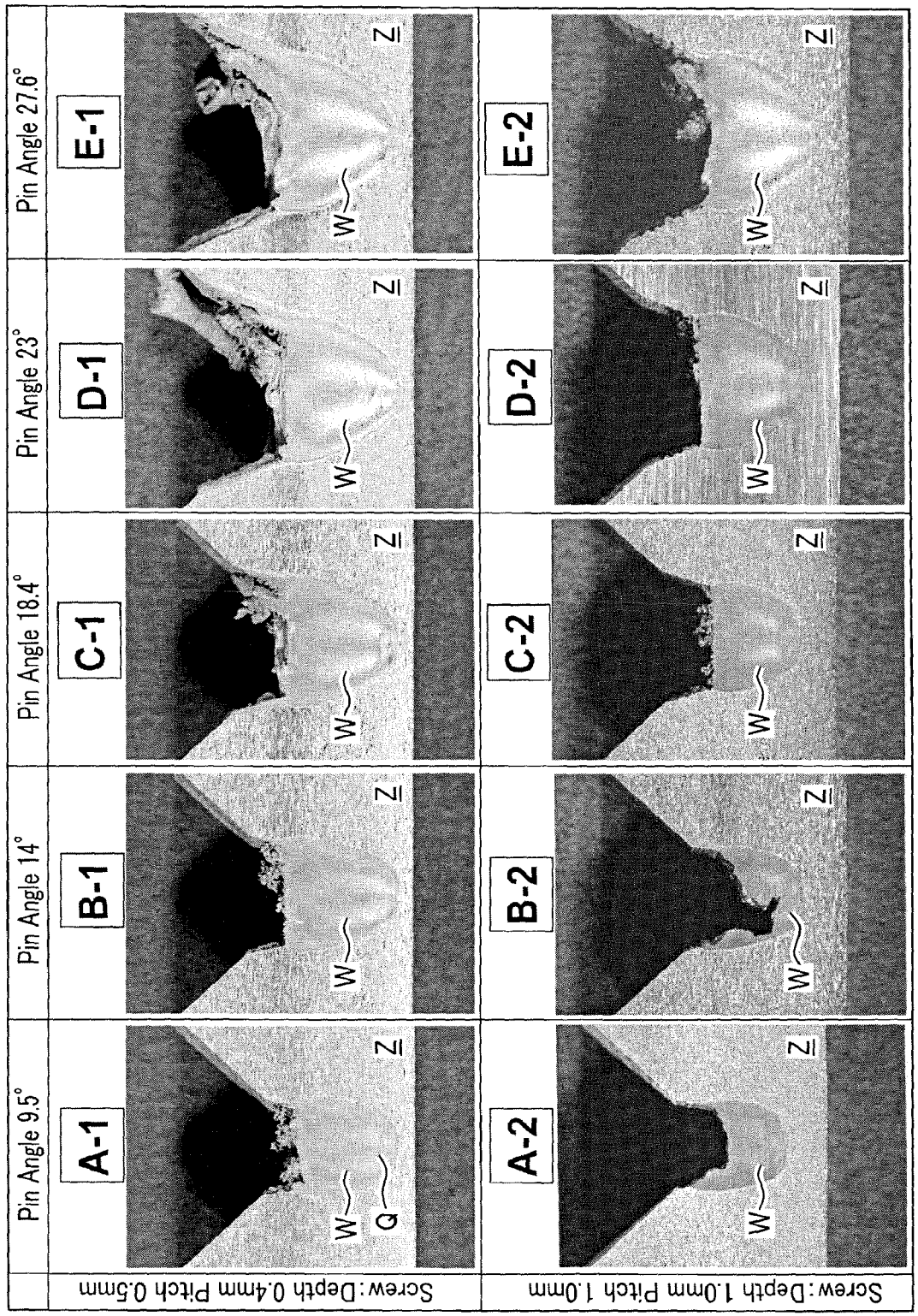
FIG. 24 is sectional views showing the results of the first and second series in working example 4.
Figure 25:
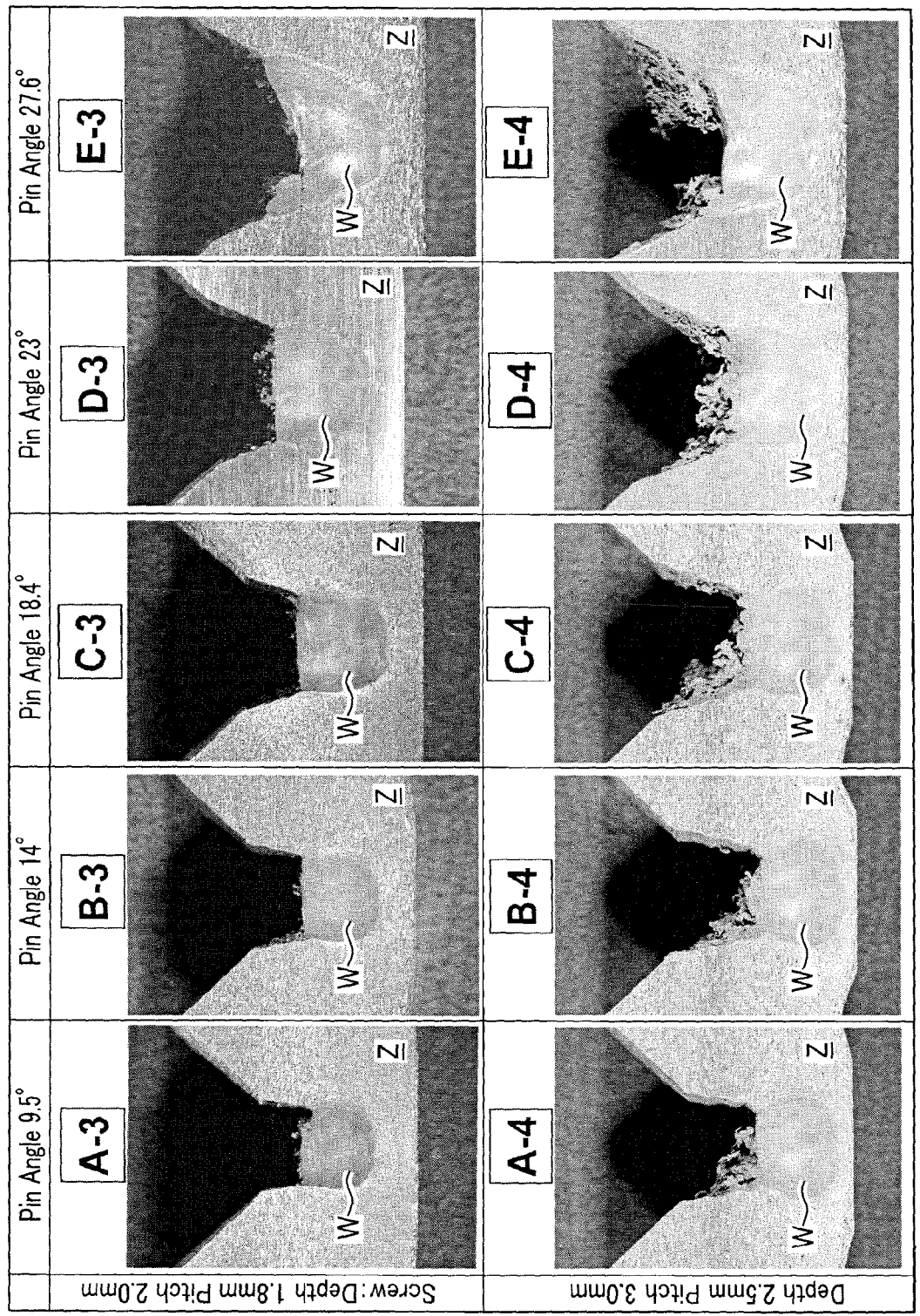
FIG. 25 is sectional views showing the results of the third and fourth series in working example 4.

As shown in FIG. 24 and FIG. 25, as the pin angle becomes larger, the cross-sectional area of the plasticized region W becomes larger. Moreover, as the screw thread depth and screw pitch become large, the plasticized region W is formed at a deeper location and the material reduction amount of the fillet portion becomes larger.

Moreover, as shown in FIG. 24 and FIG. 25, a joining defect Q occurred in the primary joining rotary tool A-1. In the primary joining rotary tool B-2, the material reduction amount was so large as to cause a poor joining The joined states were generally good except for the primary joining rotary tools A-1 and B-2.

Regarding the 4 series (A-4, B-4, C-4, D-4) shown in FIG. 25, the lower surface of the metal member Z was deformed so as to protrude downward. Moreover, in the series 1 and 4, many burrs were formed.

Working Example 5

In working example 5, the friction stir welding was carried out by using the aforementioned 20 types of primary joining rotary tools, and by setting the rotating speed to 1000 rpm and the joining speed to 200 mm/min.

Figure 26:
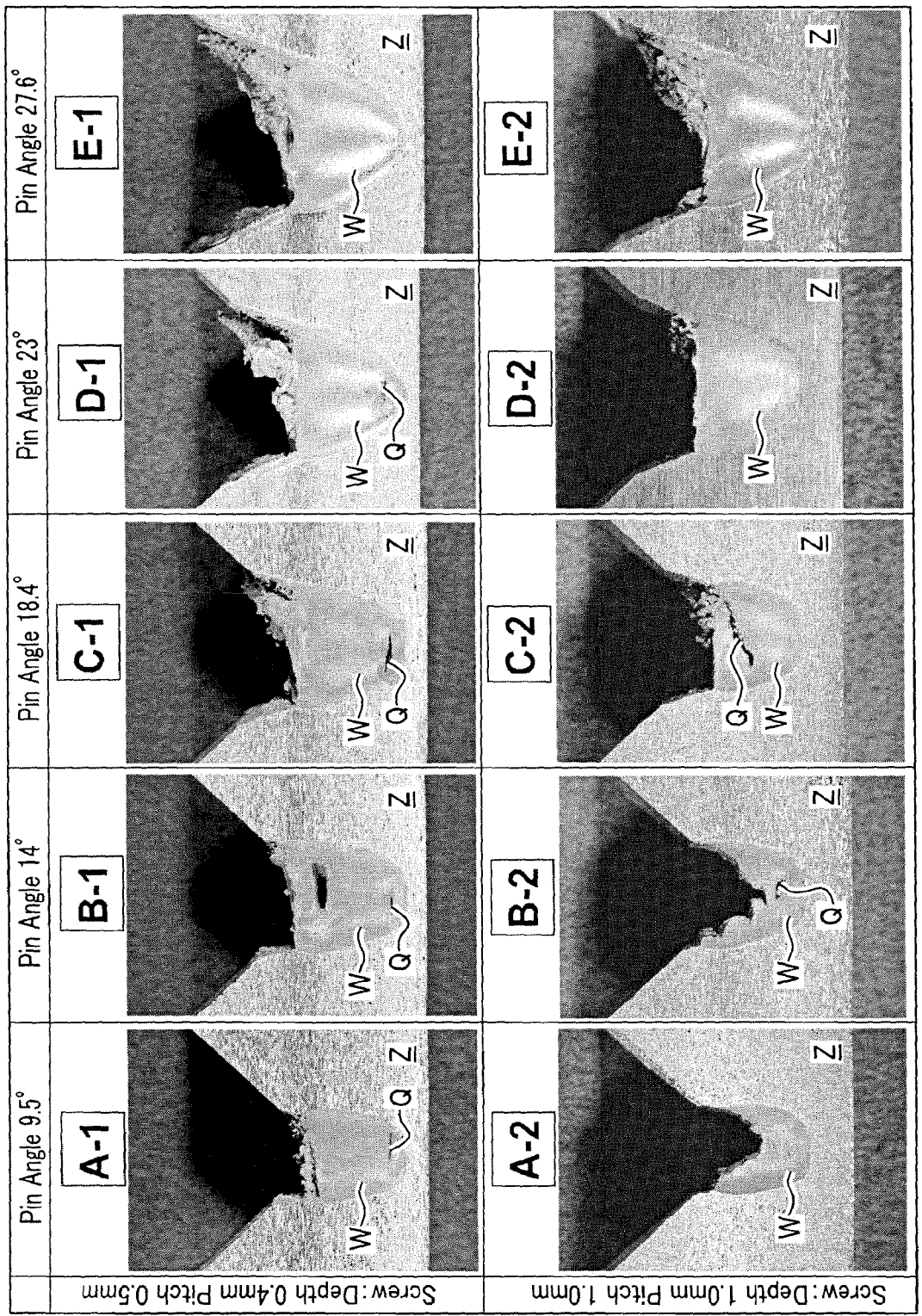
FIG. 26 is sectional views showing the results of the first and second series in working example 5.
Figure 27:
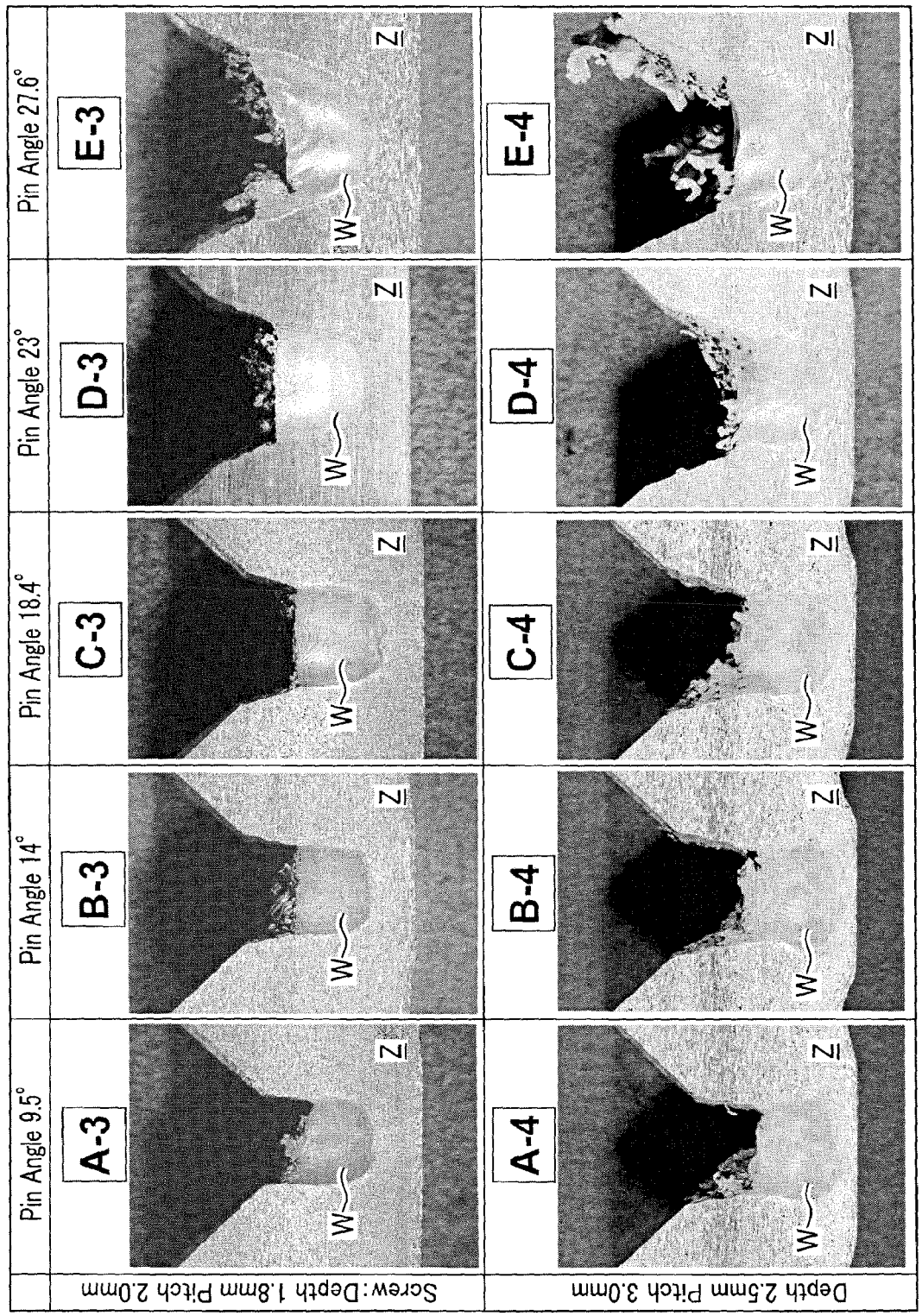
FIG. 27 is sectional views showing the results of the third and fourth series in working example 5.

As shown in FIG. 26 and FIG. 27, joining defects Q were formed by the primary joining rotary tools A-1, B-1, C-1, D-1, B-2 and C-2. Moreover, in the primary joining rotary tool A-2, the reduced amount was so large as to cause a poor joining Regarding other primary joining rotary tools, the joined states were generally good.

Observing working examples 4 and 5 on the whole teaches that, the lower the joining speed is (working example 4), the lower the incidence rate of the joining defect Q is. Moreover, it can be appreciated that, as the screw thread depth and the screw pitch become larger, the reduced amount becomes larger, but the incidence rate of joining defect becomes lower.

Figure 28:
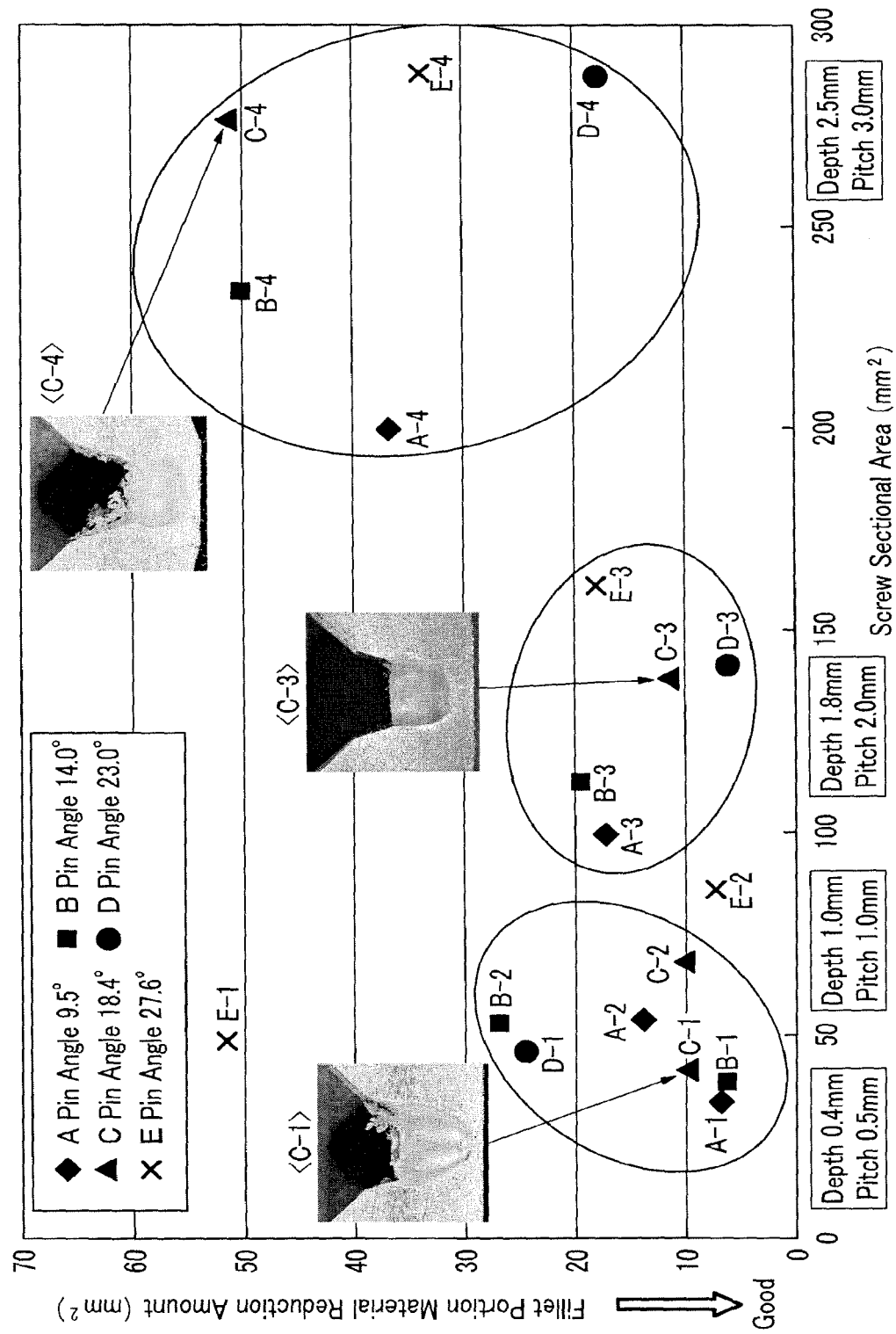
FIG. 28 is a graph showing the relationship between the sectional area of the screw and the material reduction amount of the fillet portion in working example 4.
Figure 29:
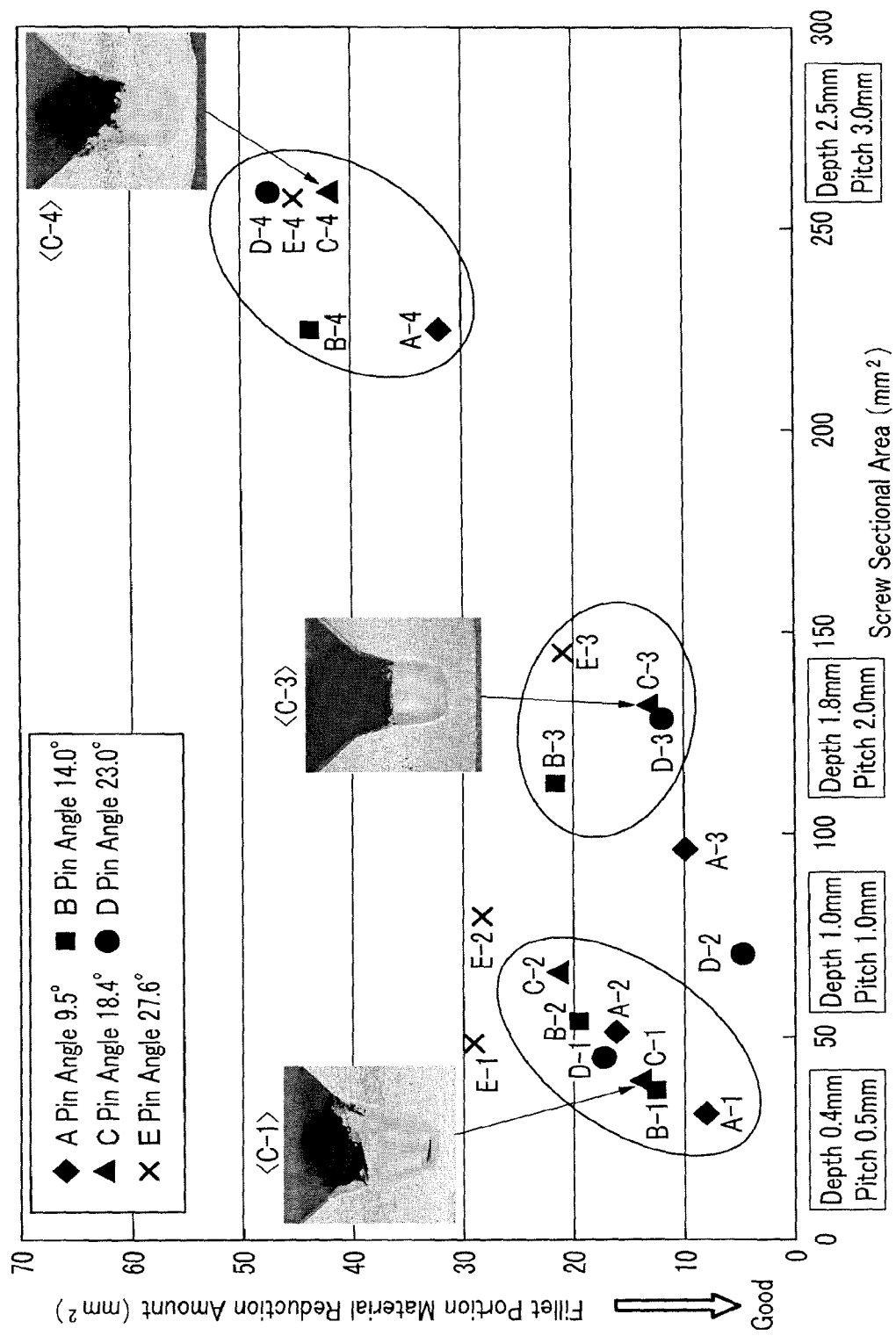
FIG. 29 is a graph showing the relationship between the sectional area of the screw and the material reduction amount of the fillet portion in working example 5.

FIG. 28 is a graph showing the relationship between the screw sectional area and the material reduction amount of the fillet portion in working example 4. FIG. 29 is a graph showing the relationship between the screw sectional area and the material reduction amount of the fillet portion in working example 5. When the screw sectional area was too small, the joining defect Q tended to occur. On other hand, when the screw sectional area was too large, the material reduction amount of the fillet portion tended to increase. Thus, the screw sectional area is preferably 50-180 $mm^2$, and more preferably 100-150 $mm^2$.

Working Example 6

In working example 6, plasticized regions were formed by moving the aforementioned 20 types of primary joining rotary tools relative to the metal members Z which are in the shape of a flat plate (with no V-shaped groove), and the cut surfaces thereof were observed. In working example 6, the rotating speed was fixed at 1000 rpm, while the joining speed was varied to either one of 100 mm/min, 200 mm/min, 300 mm/min, and 500 mm/min.

Figure 30:
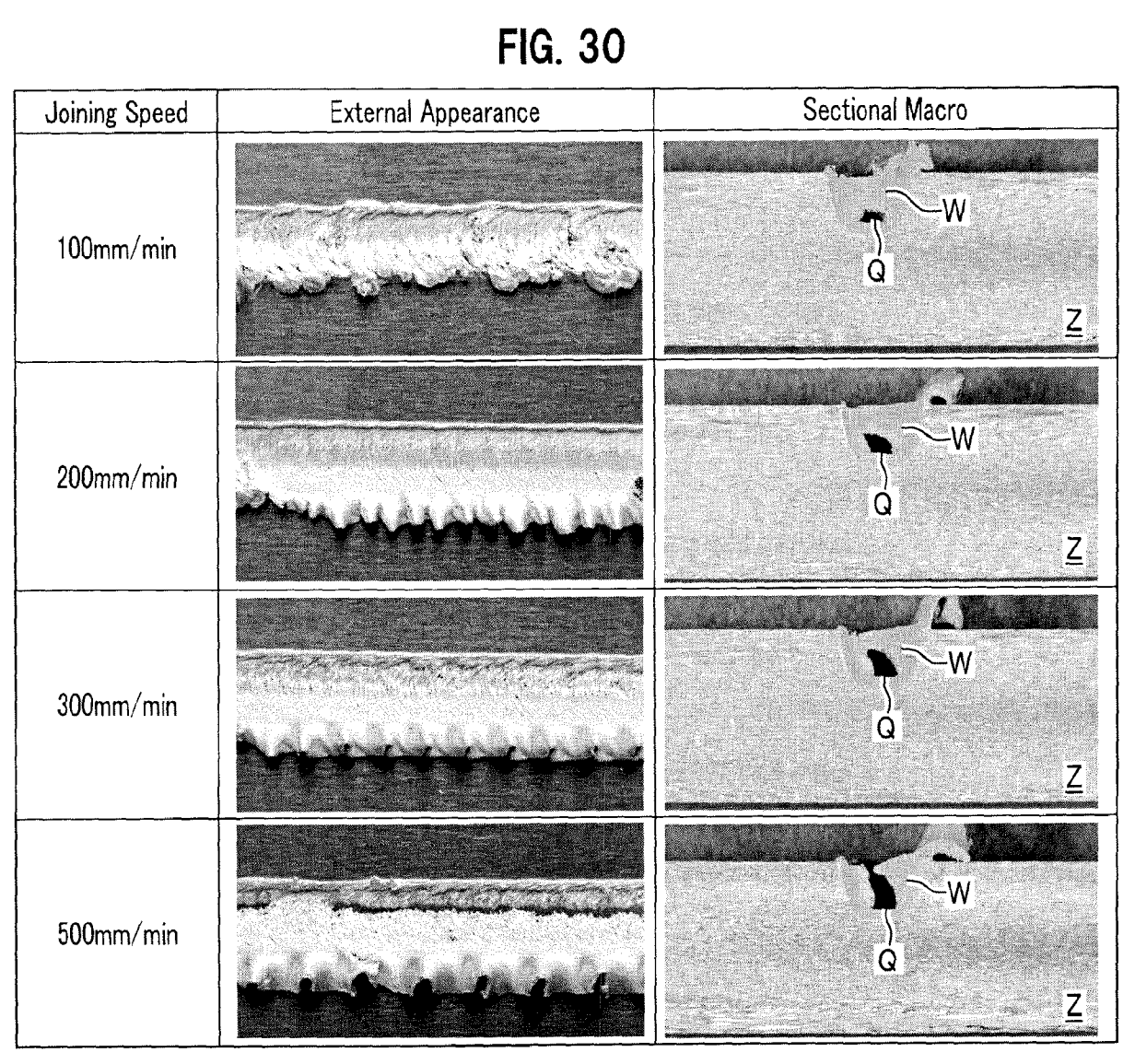
Figure 31:
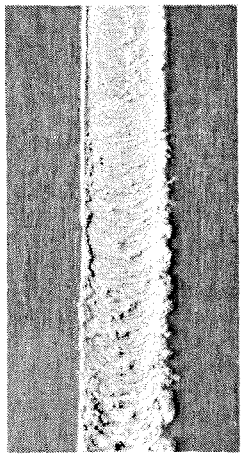
FIG. 31 is sectional views showing the results of working example 6, where the rotating speed of primary joining rotary tool C-1 is set to 1000 rpm, and the joining speed is set to 100 mm/min, 200 mm/min, 300 mm/min, and 500 mm/min.
Figure 32:
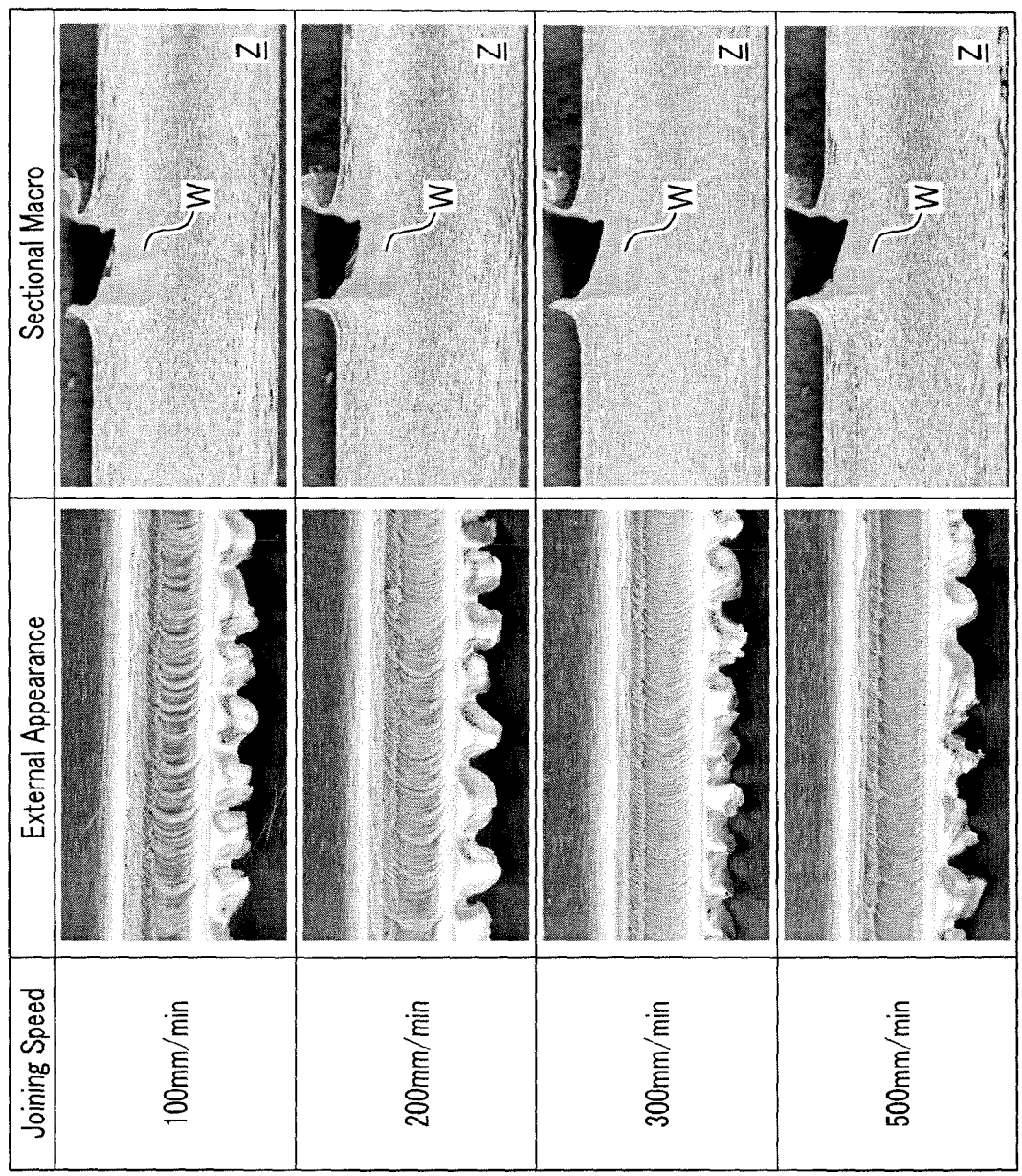
FIG. 32 is sectional views showing the results of working example 6, where the rotating speed of primary joining rotary tool A-4 is set to 1000 rpm, and the joining speed is set to 100 mm/min, 200 mm/min, 300 mm/min, and 500 mm/min.

FIG. 30 is sectional views showing the results of working example 6, where the rotating speed of the primary joining rotary tool B-1 was set to 1000 rpm and the joining speed was set to either one of 100 mm/min, 200 mm/min, 300 mm/min, and 500 mm/min. FIG. 31 is sectional views showing the results of working example 6, where the rotating speed of the primary joining rotary tool C-1 was set to 1000 rpm and the joining speed was set to either one of 100 mm/min, 200 mm/min, 300 mm/min, and 500 mm/min. FIG. 32 is sectional views showing the results of working example 6, where the rotating speed of the primary joining rotary tool A-4 was set to 1000 rpm and the joining speed was set to either one of 100 mm/min, 200 mm/min, 300 mm/min, and 500 mm/min.

Referring to FIG. 30 and FIG. 31, as the joining speed increases, the joining defect Q becomes larger. Moreover, referring to FIGS. 30-32, as the joining speed increases, the burrs increase in amount.

Figure 33:
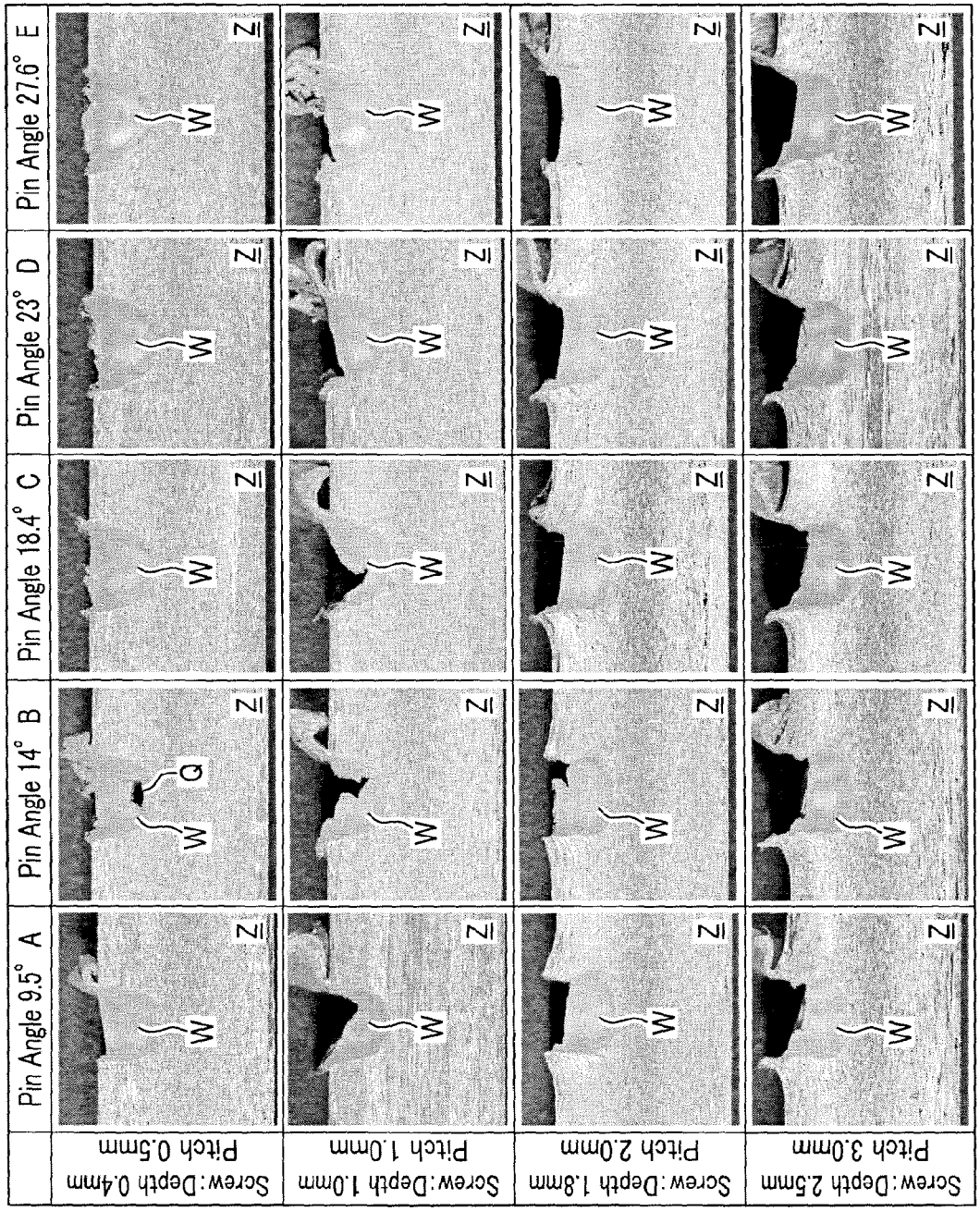
FIG. 33 is sectional views showing the results of working example 6, where the rotating speed is set to 1000 rpm and the joining speed is set to 100 mm/min.

FIG. 33 is a cross-sectional view showing results of working example 6 in which the rotating speed was set to 1000 rpm and the joining speed was set to 100 mm/min.

Figure 34:
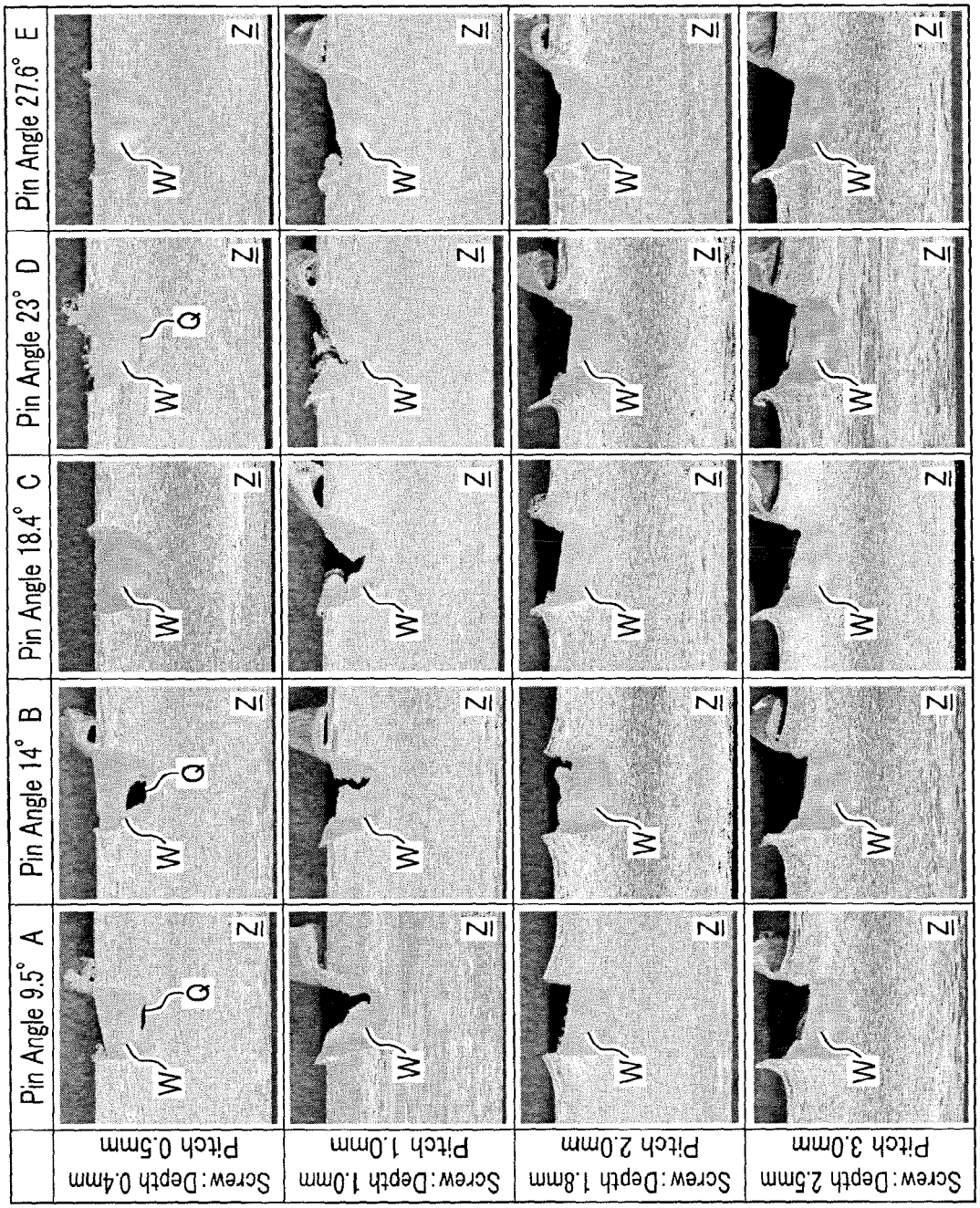
FIG. 34 is a sectional views showing the results of working example 6, where the rotating speed is set to 1000 rpm and the joining speed is set to 200 mm/min.

FIG. 34 is a cross-sectional view showing results of working example 6 in which the rotating speed was set to 1000 rpm and the joining speed was set to 200 mm/min.

Figure 35:
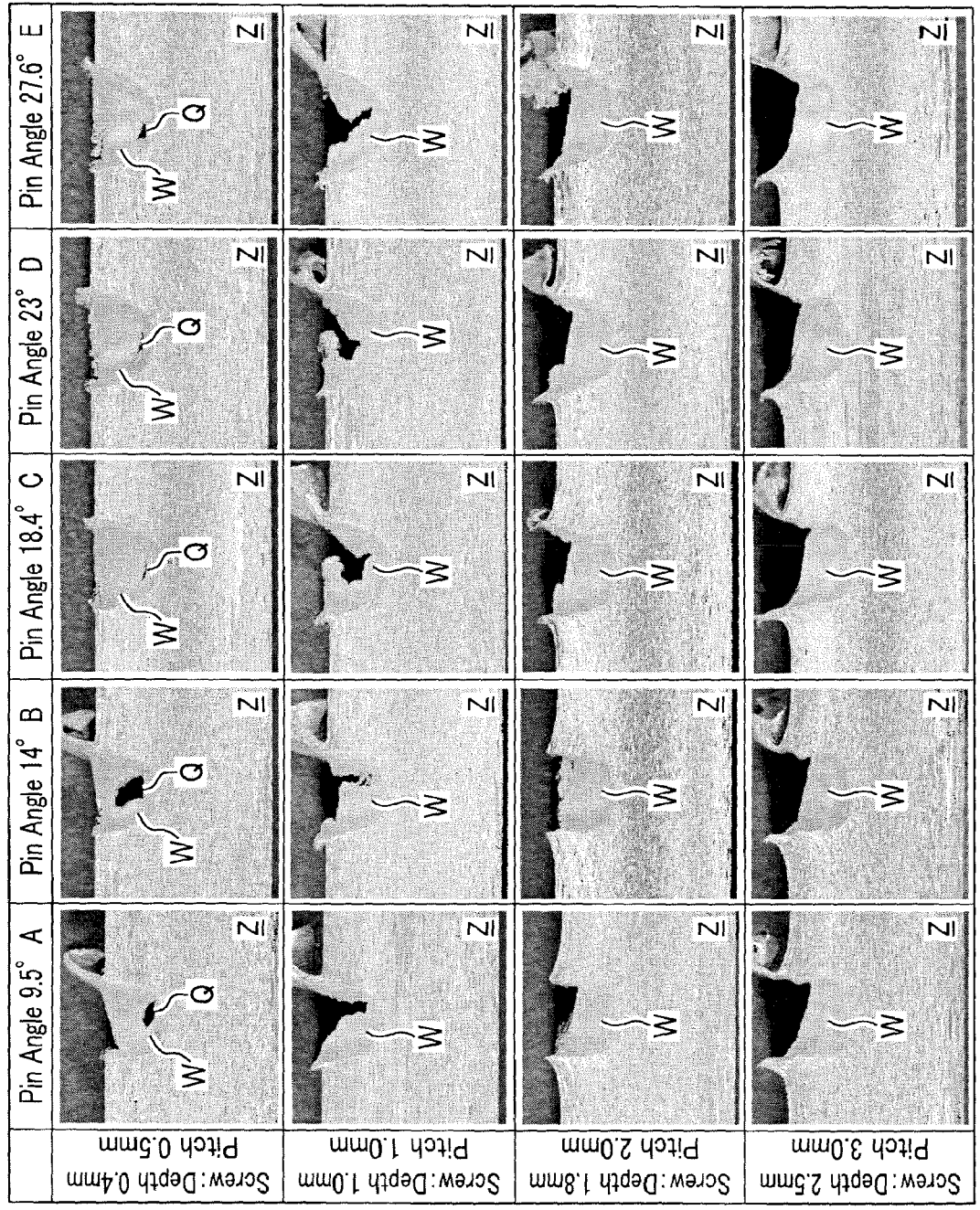
FIG. 35 is a sectional views showing the results of working example 6, where the rotating speed is set to 1000 rpm and the joining speed is set to 300 mm/min.

FIG. 35 is a cross-sectional view showing results of working example 6 in which the rotating speed was set to 1000 rpm and the joining speed was set to 300 mm/min.

Figure 36:
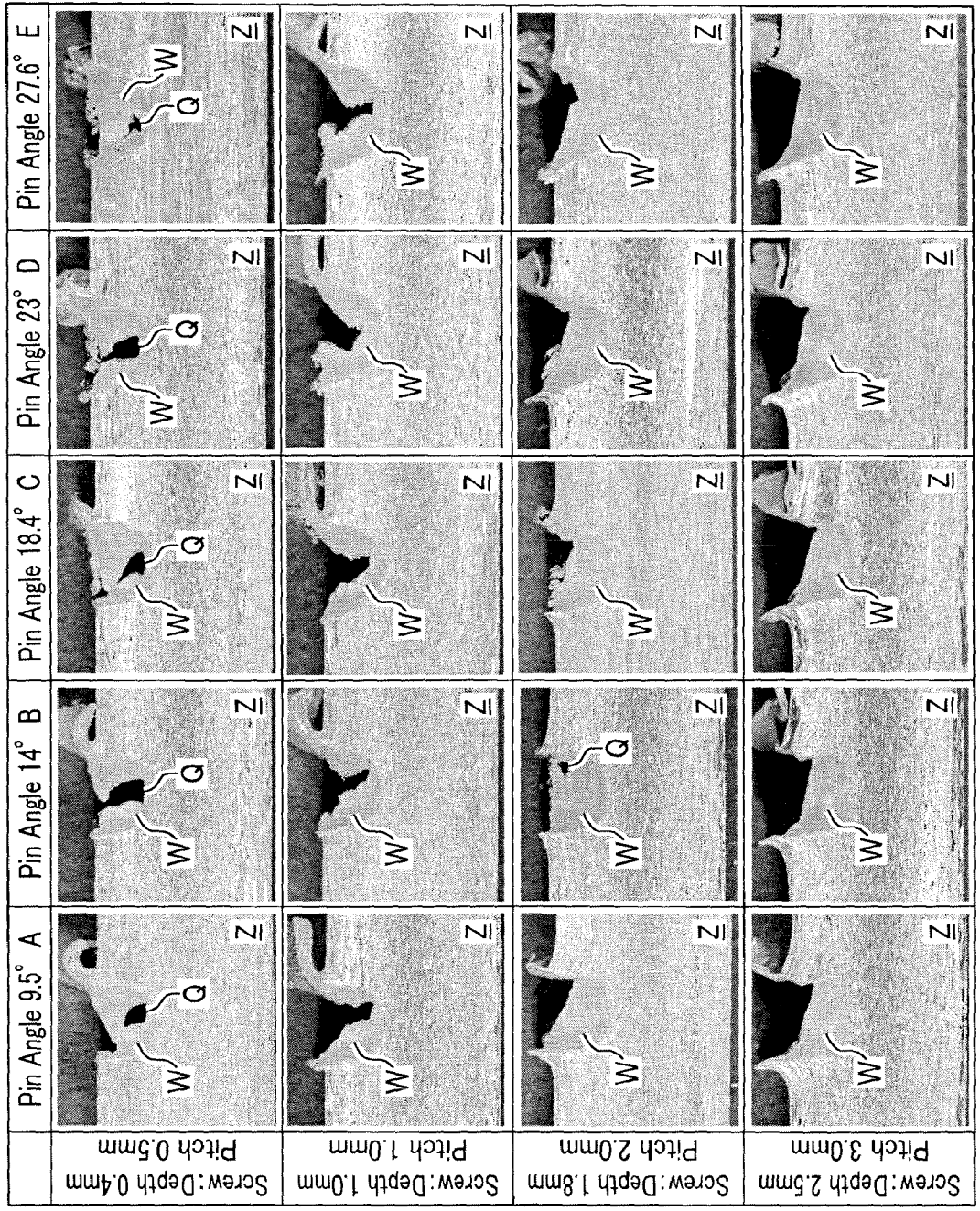
FIG. 36 is a sectional views showing the results of working example 6, where the rotating speed is set to 1000 rpm and the joining speed is set to 500 mm/min.
Figure 37:
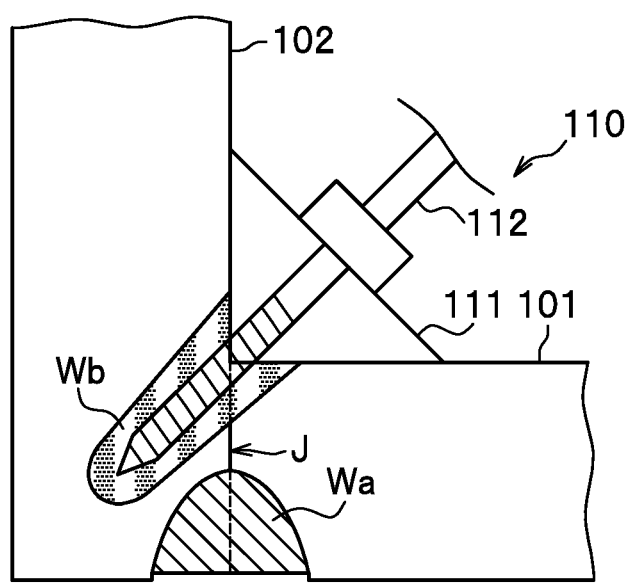
FIG. 37 is a sectional view showing the conventional friction stir welding method.

FIG. 36 is a cross-sectional view showing results of working example 6 in which the rotating speed was set to 1000 rpm and the joining speed was set to 500 mm/min.

Considering FIGS. 33-36 totally, it is preferred that the joining speed be set to a slow speed, and the screw thread depth and screw pitch be set to a large size.

DESCRIPTION OF REFERENCE NUMERALS 1 metal member
2 first tab member
3 second tab member
4 refill member
12 front surface
13 back surface
F primary joining rotary tool
F1 connection portion
F2 stirring pin
G provisional joining rotary tool
G1 shoulder portion
G2 stirring pin
J1-J4 butting portion
K pilot hole
M depressed groove
W1 plasticized region
w1-w3 plasticized region

What is claimed is:

1. A method of friction stir welding for joining two metal members together using a rotary tool including a stirring pin, comprising:
   a butting step for butting the metal members which are to be joined against each other thereby forming a butting portion; and
   a primary joining step for inserting the stirring pin in a rotating state into the butting portion of the metal members and carrying out friction stir welding with only the stirring pin contacting with the metal members with generating frictional heat,
   wherein before the primary joining step, the metal members are placed on a platform of a friction stirring apparatus, and are unmovably fixed using a jig for clamping,
   wherein in the primary joining step, a stepped portion is formed around a plasticized region on a front surface of the metal members along a movement path of the rotary tool, and
   wherein a screw sectional area, a summation of sectional areas of regions surrounded by a spiral groove and an imaginary line extending along an outer circumferential surface of the stirring pin, is 30 to 280 mm$^2$.

2. The method of friction stir welding according to claim 1, wherein
   in the butting step, the metal members are abutted to form a correspondingly flat surface.

3. The method of friction stir welding according to claim 1, comprising
   a step for carrying out buildup welding on a plasticized region formed in the primary joining step.

4. A method of friction stir welding for joining two metal members together using a rotary tool including a stirring pin, comprising:
   a butting step for butting the metal members which are to be joined against each other;
   a provisional joining step for joining the metal members together provisionally by carrying out friction stirring on a butting portion of the metal members;
   a primary joining step for inserting the stirring pin in a rotating state into the butting portion of the metal members and carrying out friction stir welding with only the stirring pin contacting with the metal members with generating frictional heat, wherein before the provisional joining step, the metal members are placed on a platform of a friction stirring apparatus, and are unmovably fixed using a jig for clamping;
   a depressed groove forming step for forming a depressed groove on a front surface of a plasticized region formed in the primary joining step;
   a disposing step for disposing a refill member on the depressed groove formed in the depressed groove forming step; and
   a refill member joining step for joining the refill member to the metal members.

5. The method of friction stir welding according to claim 1,
   wherein in the provisional joining step, the friction stirring is carried out on the butting portion of the metal members.

6. The method of friction stir welding according to claim 1, comprising
   a tab member disposing step for disposing a first tab member and a second tab member on both sides of the butting portion of the metal members, wherein
   in the primary joining step, the stirring pin in the rotating state is inserted into a starting position set on the first tab member, and the stirring pin in the rotating state is uplifted from a complete position set on the second tab member.

7. The method of friction stir welding according to claim 2, comprising
   a step for carrying out buildup welding on a plasticized region formed in the primary joining step.

8. A method of friction stir welding for joining two metal members together using a rotary tool including a stirring pin, comprising:
   a butting step for butting the metal members which are to be joined against each other;
   a provisional joining step for joining the metal members together provisionally by carrying out friction stirring on a butting portion of the metal members;
   a primary joining step for inserting the stirring pin in a rotating state into the butting portion of the metal members and carrying out friction stir welding with only the stirring pin contacting with the metal members with generating frictional heat;

a depressed groove forming step for forming a depressed groove on a front surface of a plasticized region formed in the primary joining step;

a disposing step for disposing a refill member on the depressed groove formed in the depressed groove forming step; and a refill member joining step for joining the refill member to the metal members, wherein before the provisional joining step, the metal members are placed on a platform of a friction stirring apparatus, and are unmovably fixed using a jig for clamping, and wherein in the butting step, the metal members are abutted to form a correspondingly flat surface.

9. The method of friction stir welding according to claim 2, wherein in the provisional joining step, the friction stirring is carried out on the butting portion of the metal members.

10. The method of friction stir welding according to claim 2, comprising a tab member disposing step for disposing a first tab member and a second tab member on both sides of the butting portion of the metal members, wherein in the primary joining step, the stirring pin in the rotating state is inserted into a starting position set on the first tab member, and the stirring pin in the rotating state is uplifted from a complete position set on the second tab member.

* * * * *